(12) United States Patent
Chow

(10) Patent No.: US 9,001,035 B2
(45) Date of Patent: Apr. 7, 2015

(54) CONFIGURED INPUT DISPLAY FOR COMMUNICATING TO COMPUTATIONAL APPARATUS

(71) Applicant: Jeffrey L. Chow, Boulder, CO (US)

(72) Inventor: Jeffrey L. Chow, Boulder, CO (US)

(73) Assignee: Red Bird Rising, LLC, Boulder, CO (US)

( * ) Notice: Subject to any disclaimer, the term of this patent is extended or adjusted under 35 U.S.C. 154(b) by 3 days.

(21) Appl. No.: 14/059,259

(22) Filed: Oct. 21, 2013

(65) Prior Publication Data

US 2014/0111422 A1 Apr. 24, 2014

Related U.S. Application Data

(60) Provisional application No. 61/716,403, filed on Oct. 19, 2012.

(51) Int. Cl.
| | |
|---|---|
| G06F 3/0482 | (2013.01) |
| G06F 3/0488 | (2013.01) |
| G06F 3/0484 | (2013.01) |

(52) U.S. Cl.
CPC .... *G06F 3/0482* (2013.01); *G06F 2203/04808* (2013.01); *G06F 3/04883* (2013.01); *G06F 3/04886* (2013.01); *G06F 3/04847* (2013.01)

(58) Field of Classification Search
CPC ............. G09G 5/00; G09G 3/36; G09G 5/10; G06F 3/041; G06F 3/048
See application file for complete search history.

(56) References Cited

U.S. PATENT DOCUMENTS

| | | | |
|---|---|---|---|
| 8,448,083 B1 * | 5/2013 | Migos et al. ................. | 715/781 |
| 2013/0093687 A1 * | 4/2013 | Papakipos et al. ............ | 345/173 |

* cited by examiner

*Primary Examiner* — Michael Faragalla
(74) *Attorney, Agent, or Firm* — Sheridan Ross P.C.

(57) ABSTRACT

According to various embodiments, an input device is provided for receiving one of a plurality of commands via the manipulation of one or more fingers of a user and sending output commands to a separate device based on the nature of the manipulation. According to one embodiment, the input device is a hand-held tablet and the separate device is a computer. In one embodiment, the system may be used for editing electronic video or audio content.

10 Claims, 33 Drawing Sheets

CONFIGURED INPUT DISPLAY FOR COMMUNICATING TO COMPUTATIONAL APPARATUS

CROSS-REFERENCE TO RELATED APPLICATIONS

The present application claims priority from U.S. Provisional Application No. 61/716,403, filed Oct. 19, 2012, the entire disclosure of which is hereby incorporated by reference.

BACKGROUND OF THE INVENTION

Software and hardware suppliers are consistently trying to develop new applications to make tasks, such as interfacing with a computational apparatus (i.e., a computer), both simpler and more efficient. Applications designed for interfacing with such apparatus that are presently available work solely in one environment, such as a traditional QWERTY keyboard or other mechanical pushbutton array or separately on a capacitive-sensing or other technology-based touch screen. These applications also require familiarity with a particular or provided interface, and often do not permit a user to benefit from his or her knowledge or preference (such as right handed or left handed operation, single handed operation, shortcut keystroke commands, touch and texture dependant interfacing, etc.) to manipulate and efficiently use the application.

Another problem exists where our most common form of input, the keyboard, has not adapted to the changing needs of computer users. The initial computers were considered word processors, the successor to the typewriter. As times evolved, computers have taken on more and more tasks that go well beyond typing, for which the keyboard was not designed. From media playback, to browsing the internet to digital creation where we manipulate and create images and photographs, produce films, draw and paint art. Typing/word processing is no longer the primary task of most computer users, comprising of only a small percentage of what we do on computers.

The computer has changed, but the keyboard hasn't. It is no longer the most appropriate interface for non-typing tasks, which is exemplified by the presence of extensive keyboard shortcuts. The mouse is very flexible to a GUI, but is slow and requires precise hand movement. Keyboards, while providing a faster form of input, lack the necessary flexibility that typical computing users' desire. The stop gap solution to this problem is to create keyboard shortcuts that permit a gain in speed, but at the expense of having to memorize letter-to-function shortcuts, a time and memory intensive task.

Additionally, keyboard shortcuts traditionally use letters as part of the combination keystroke commands that are determined phoenetically (i.e., I for in and O for out), which causes additional problems. These problems arise due to the keyboard having a QWERTY layout pattern and therefore no operational organization to make the command keystrokes easier for the user (based on location of the particular keys, when the keyboard is organized by letter). With a custom interface, these problems are eliminated and it permits a user to organize buttons by function and without requiring the user to memorize shortcuts.

Touch screen displays have gained common proliferation, for example, due to the release of several touch screen platforms, including the iPhone. The computing population are increasingly using a touch screen based device and learning a natural user interface (NUI) where one can see a button within a GUI and touch it to cause an action. Larger touch screen devices such as iPads have begun to take away some of the tasks traditionally done on laptops and desktops.

These interfaces often permit a direct link to the software, which presents certain drawbacks. For tasks such as image editing, for example, a user may be touching the screen and leaving smudges that obscure or decrease the visual quality of the image. In addition, the use of a user's hand or stylus will often block parts of the image while interacting with the display, which is less than ideal. Also, for professionals, having the input and the screen in the same plane on the same device has ergonomic disadvantages. For example, when operating a computer it is recommended that the top of the screen be at eye level and the input device, most often the keyboard and mouse at a height approximately 5 inches above the lap where the shoulders can relax and arms naturally bent at 90 degrees. This is impossible to achieve when the input and screen are one and the same, as with current touch screen devices.

A new form of interaction involves gestures in the free air as with, for example, Microsoft Kinect. At the current state of the technology, the advantage of a free air movement is outweighed by the disadvantage of a lack of tactile response. The current state of the art employs a movement-visual action-response system. One must match their movement with a solely visual feedback system. Our bodies have an amazing visual system, but still rely on a combination of sensory feedback for intuitive and natural interactions. For example, when grabbing a virtual box by extending your arm and closing your hand, the only feedback you have correctly grabbed it in the current state of the art is the corresponding visual cue (say an animation of a digital hand grabbing a digital box). You do not feel anything through the touch sensors. That feedback, it turns out, is crucial to intuitive interfaces. Additionally, waving at a computer display for an extended period of time is undesirable and causes fatigue.

There is also a shortcoming in the current state of the art with respect to user defined or user customized interfaces with such applications. Preferably, a user would have access to tools for creating customized interfaces in order to, by way of example but not limitation, create custom keystroke or movement based commands (i.e, physical gestures, speech or other sounds, cognizable eye movement, etc.) for communicating with the computational apparatus. Thus, there are several problems presently faced by those in the art with respect to available input devices for interfacing with computational apparatus.

SUMMARY OF THE INVENTION

It is with respect to the above issues and other problems that the embodiments presented herein were contemplated. By connecting or separating the touch screen input from the computing device display, one can get the flexibility and speed of a touch screen user interface combined with the ergonomics of a separated input and display computing device. Disclosed herein are several embodiments which may account for one or more computing devices and facilitate a user experience and desired manipulation therewith.

In certain embodiments, the input device is connected to a single computing device. If multiple devices (mobile devices, touch screen devices, TVs, digital displays, computing devices, etc.) are used, it is assumed they are able to communicate with each other, which is often achieved through wired or wireless technologies. The touch screen device may also double as the computing device where an additional display output may be obtained.

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The term "mobile device" or "mobile computer" as used herein refers to any hardware device and/or software operable to engage in a computing session. For example, a mobile device can be an IP-enabled computer, a tablet computer, a cellular phone, a personal digital assistant, a laptop computer system, etc. In embodiments, the mobile computer is a iPad or other tablet computing apparatus.

The term "network" as used herein refers to a system used by a communication platform to provide communications between mobile computers. The network can consist of one or more session managers, feature servers, mobile computers, etc. that allow communications, whether voice or data, between two users. A network can be any particular type of network or communication system. Generally, a network can be a local area network (LAN), a wide area network (WAN), a wireless LAN, a wireless WAN, the Internet, etc. that receives and transmits messages or data between devices to facilitate communication platform activities. A network may communicate in any format or protocol known in the art, such as, transmission control protocol/internet protocol (TCP/IP), 3202.11g, 3202.11n, Bluetooth, or other formats or protocols.

The term "touch screen" as used herein refers to any capacitive sensing or other technology based touch screen device, including a touch screen device that is provided in combination with a computational apparatus (i.e., the computational apparatus may have two distinct input methods, for example, a keyboard and a touch screen compatible display).

The term "database," "archive," or "data structure" as used herein refers to any system, hardware, software, memory, storage device, firmware, component, etc., that stores data. The data model can be any type of database or storage framework, which is stored on any type of non-transitory, tangible computer readable medium. A database can include one or more data structures, which may comprise one or more sections or portions that store an item of data. A section may include, depending on the type of data structure, an attribute of an object, a data field, or other types of sections included in one or more types of data structures. The data structure can represent a text string or be a component of any type of database, for example, relational databases, flat file databases, object-oriented databases, or other types of databases. Further, the data structures can be stored in memory or memory structures that may be used in either run-time applications or in initializing a communication.

The phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine", "calculate" and "compute," and variations thereof, as used herein, are used interchangeably and include any type of methodology, process, mathematical operation or technique.

The term "identifier (ID)" and variations thereof, as used herein, refers to An identifier as described herein can be an numeric, alphanumeric, symbolic, globally unique identifier, or other identifier as understood in the art.

The term "module" refers to any known or later developed hardware, software, firmware, artificial intelligence, fuzzy logic, or combination of hardware and software that is capable of performing the functionality associated with that element. Also, while the various concepts are described in terms of exemplary embodiments, it should be appreciated that aspects can be separately claimed.

Hereinafter, "in communication" shall mean any electrical connection, whether wireless or wired, that allows two or more systems, components, modules, devices, etc. to exchange data, signals, or other information using any protocol or format.

It shall be understood that the term "means" as used herein shall be given its broadest possible interpretation in accordance with 35 U.S.C., section 112, paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Embodiments presented herein disclose an interface for communicating with computational apparatus, comprising a plurality of input icons or "buttons" which may have one or more defined command outputs. As used throughout this disclosure, the term "buttons" is used in connection with a variety of interactive icons associated with a touch screen display, and the term is not limited to a single movement operation such as is typically described with a push-style button. Rather, the use of the term broadly covers icons used by a user to manipulate a computing device, and may receive, by way of example but not limitation, a touch, a swipe, a drag, a pinch, an arc, or a direction-specific gesture.

By way of further example, the buttons may have a specific command if a user presses on the button, and a different specific command if the user holds, rotates, drags, or swipes across the button. In certain embodiments, various buttons are displayed visually about the interface in a manner that is intuitive and/or efficient for a user to input typical commands. For example, the buttons that are often used simultaneously may be positioned adjacent to one another and have the approximate size of a users fingers, such that the user may simultaneously depress the two (or more) buttons with a single hand. This advantage solves the problem, among others, that exists for many shortcut keystroke commands, which typically require a user to depress two or more buttons simultaneously (such as on a traditional QWERTY keyboard device), which are located apart from each other and are therefore inconvenient to operate simultaneously. This optimized layout creates a distinctive advantage in efficiency compared to a grid layout. The spacing, size, color and other distinctive attributes lends a functional different in the user being able to discern groups of actions.

Further, a database or "toolkit" of templates for creating custom icons and/or commands may be provided for facilitating the development of a user defined application. In this embodiment, the user may select pre-configured icons based on the desired functionality of a particular application.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

In the drawings:

FIG. 1 is a plan view of a specific customized interface according to one particular embodiment of the present disclosure;

FIG. 2 is another plan view of a specific customized interface according to the embodiment shown in FIG. 1;

FIG. 3 is a plan view of a specific customized interface according to another embodiment of the present disclosure;

FIG. 4 is a plan view of a specific customized interface according to yet another embodiment of the present disclosure;

FIG. 5 is a plan view of a specific customized interface according to yet another embodiment of the present disclosure;

FIG. 6 is a plan view of a specific customized interface according to yet another embodiment of the present disclosure;

FIG. 7 is a plan view of a specific customized interface according to yet another embodiment of the present disclosure;

FIG. 8 is a plan view of a specific customized interface according to yet another embodiment of the present disclosure;

FIG. 9 is a plan view of a specific customized interface according to yet another embodiment of the present disclosure;

FIG. 10 is a plan view of a specific customized interface according to yet another embodiment of the present disclosure;

FIG. 11 is a plan view of a specific customized interface according to yet another embodiment of the present disclosure;

Figure 12:
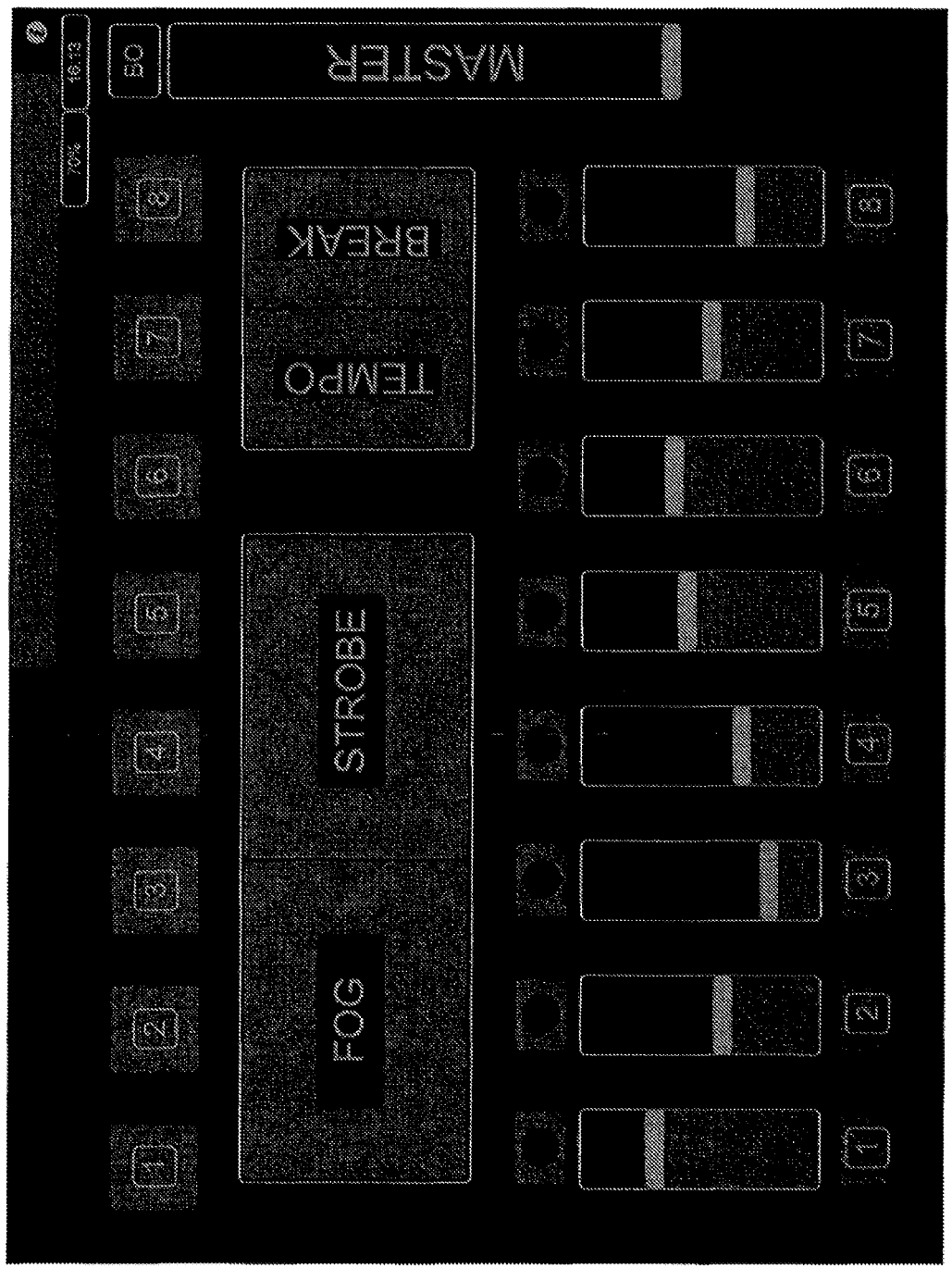
Figure 13:
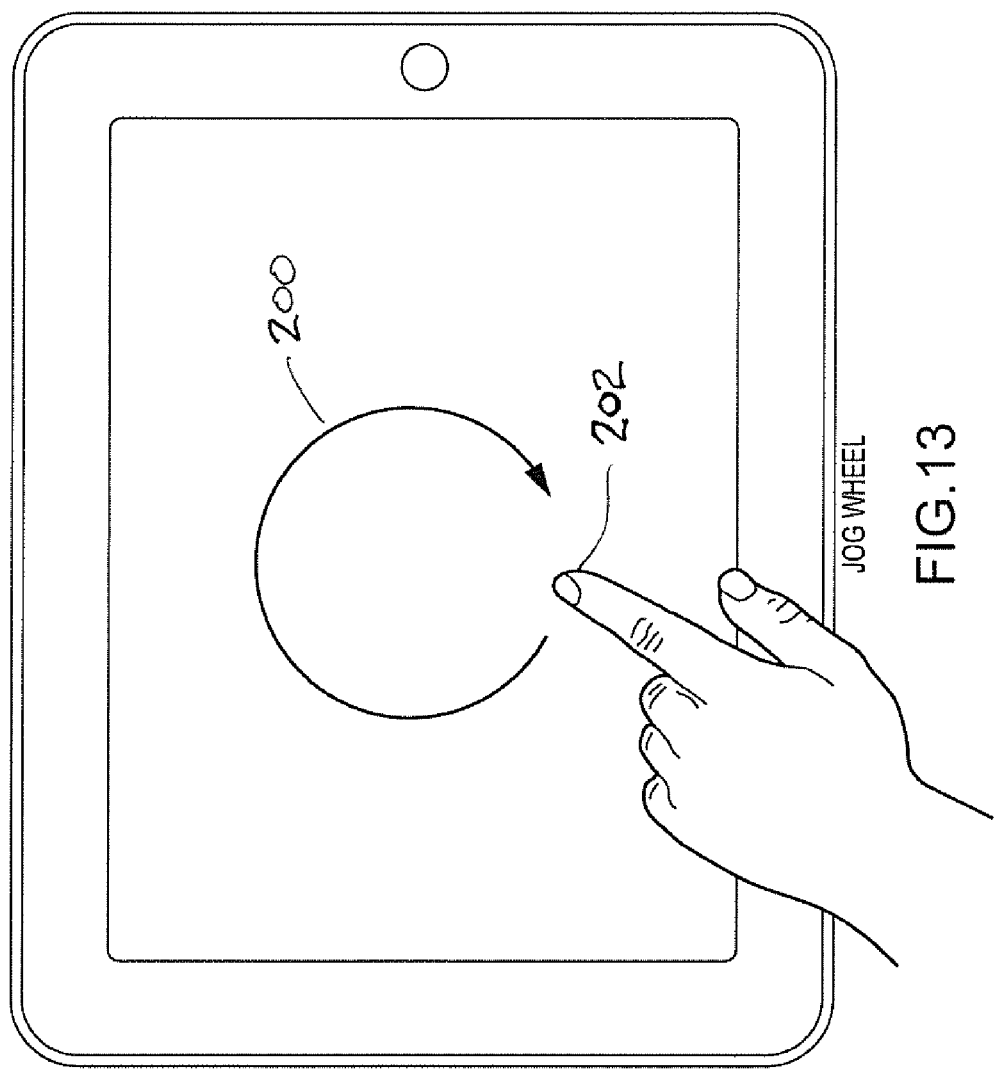
Figure 14:
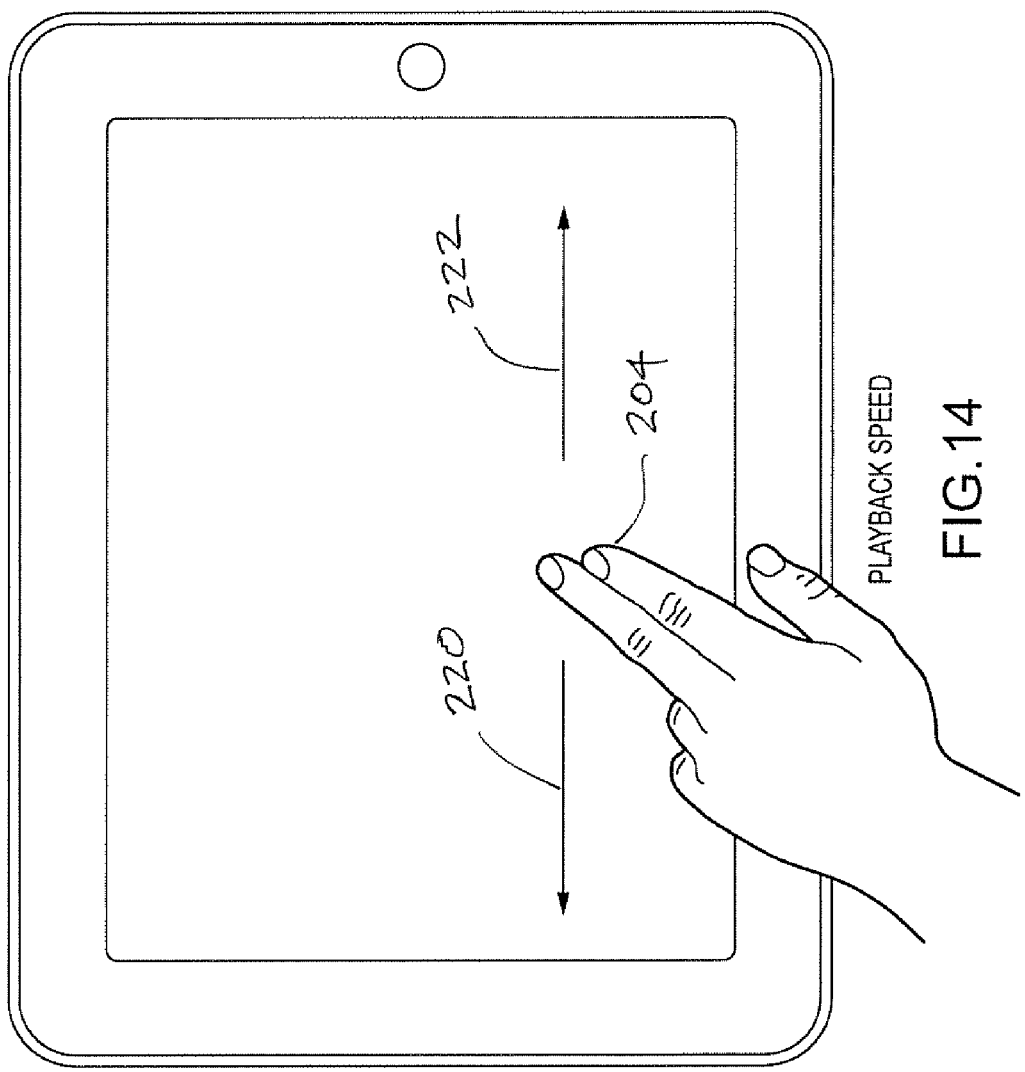
Figure 15:
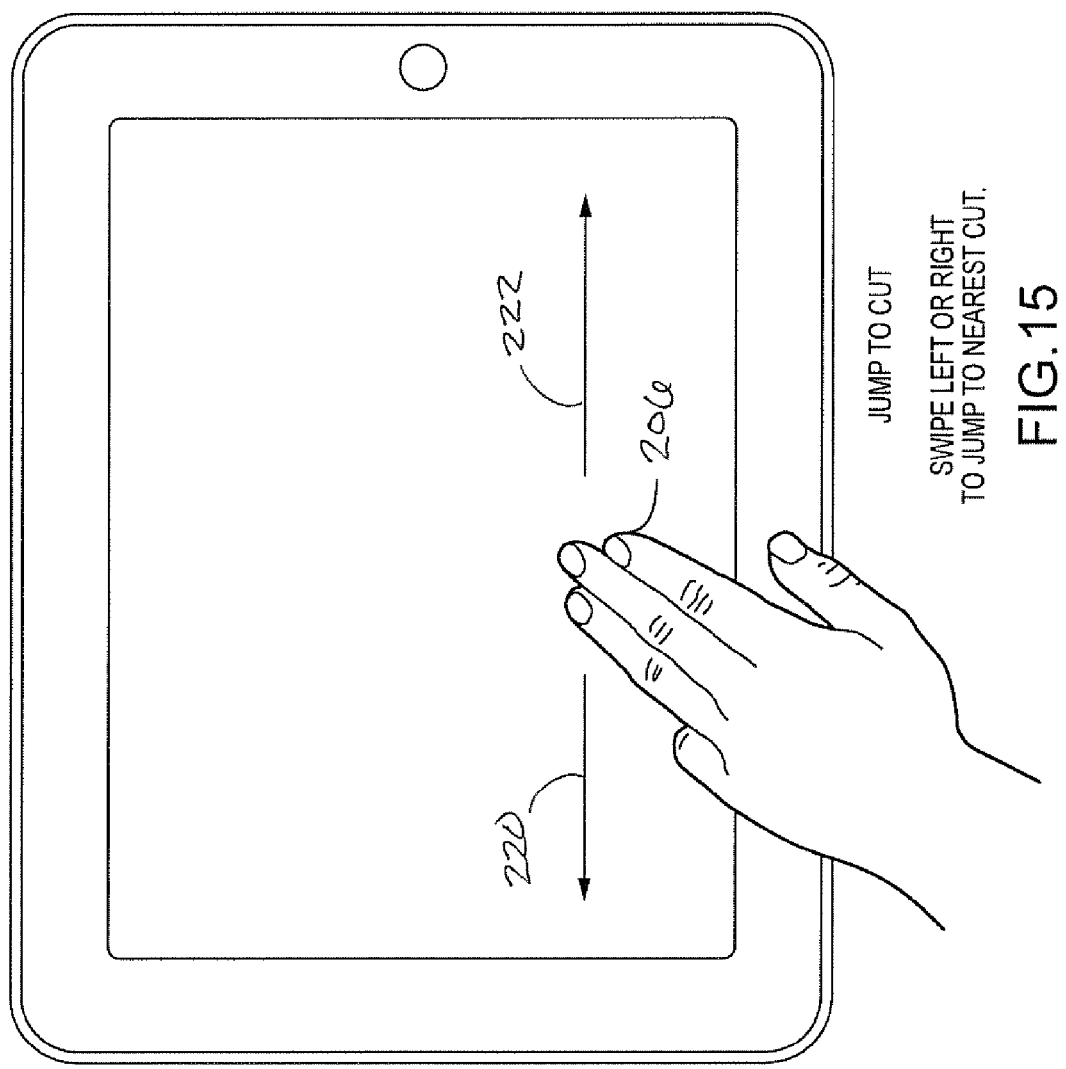
Figure 16:
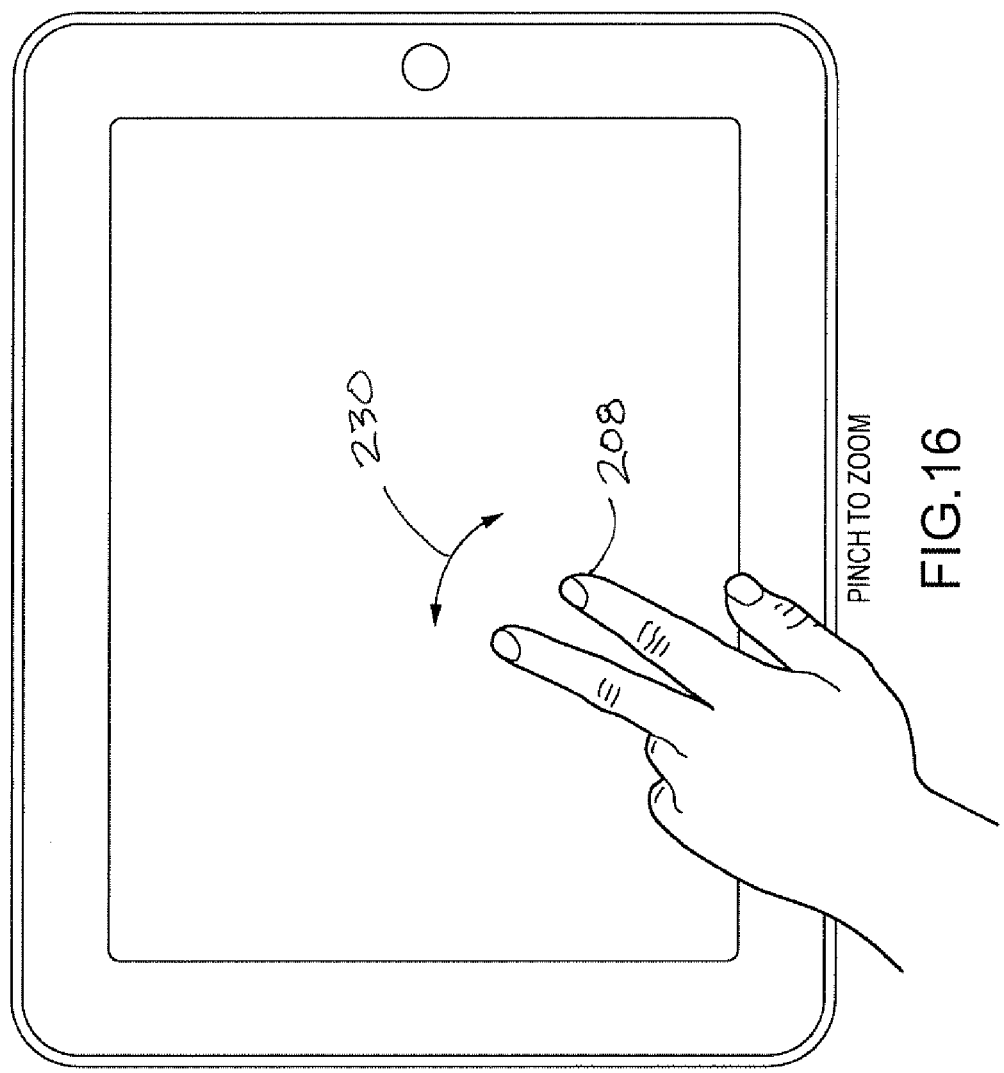
Figure 17:
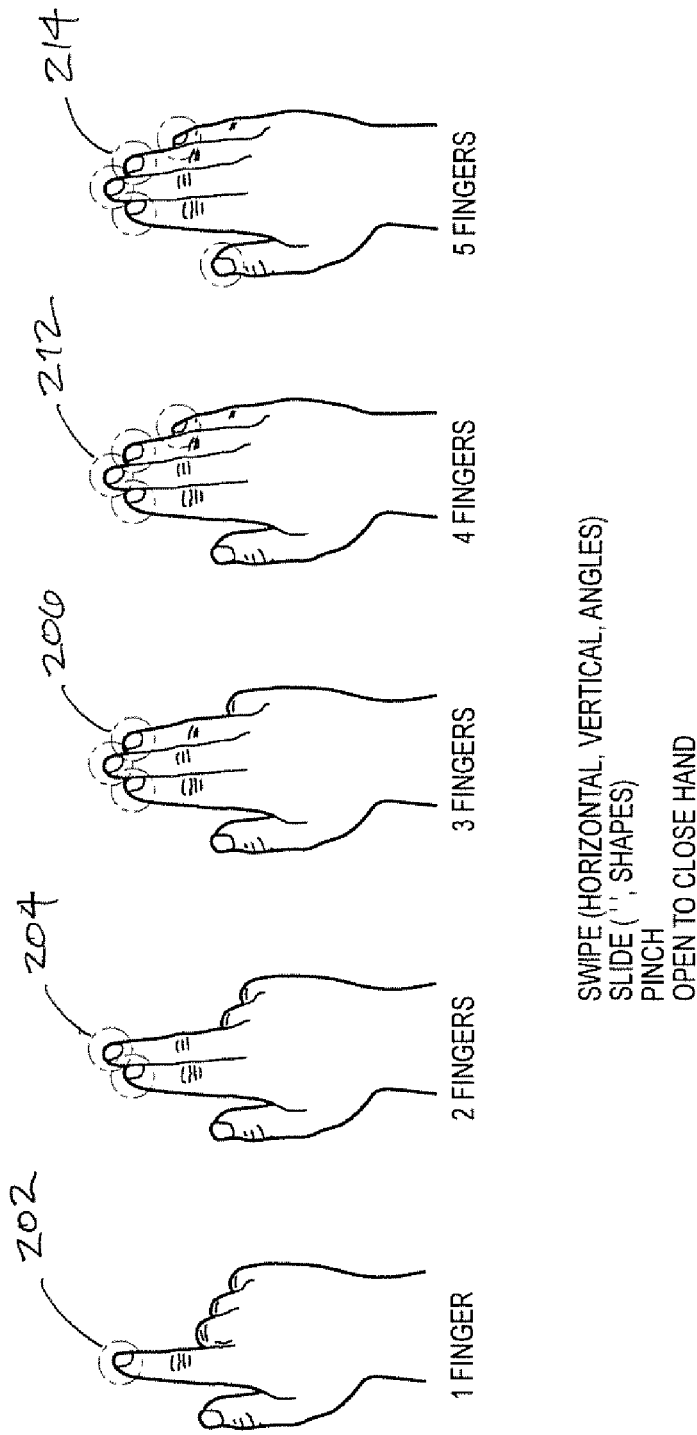
Figure 18:
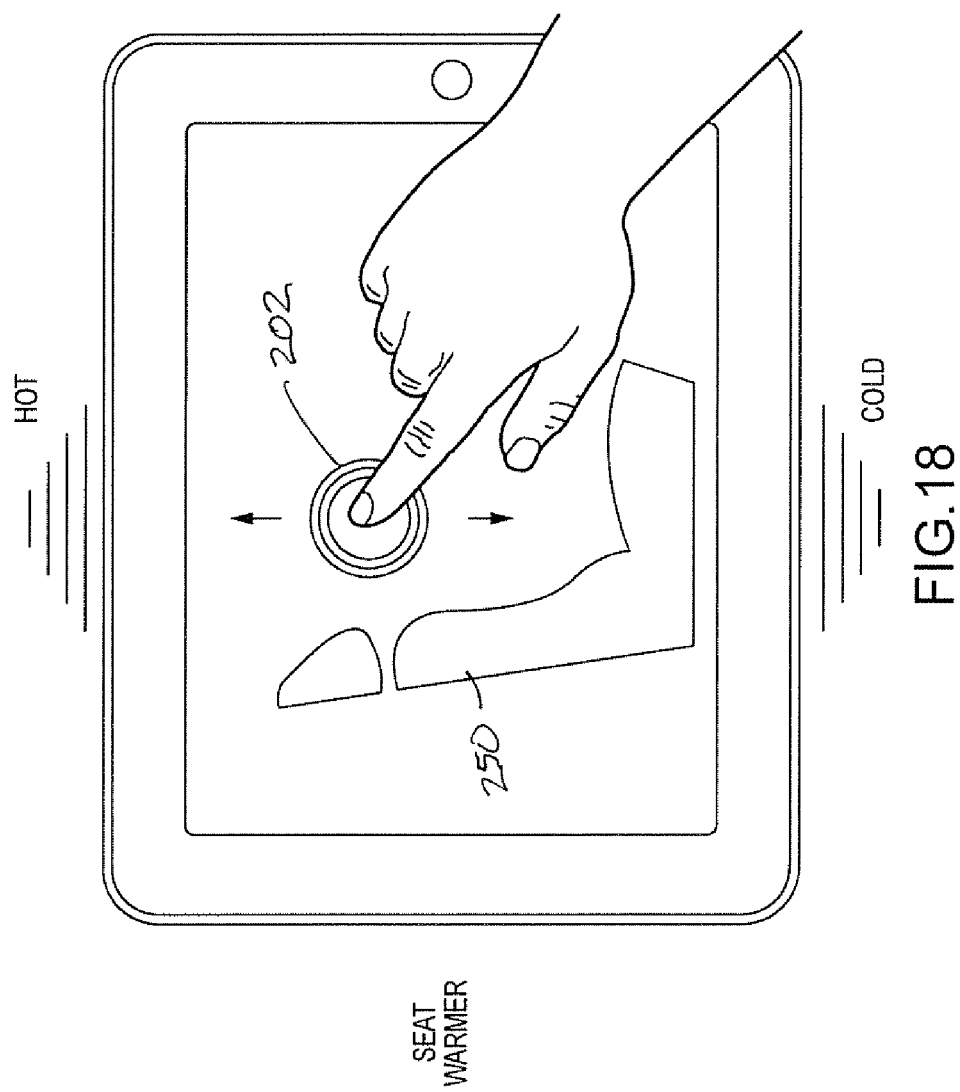
Figure 19:
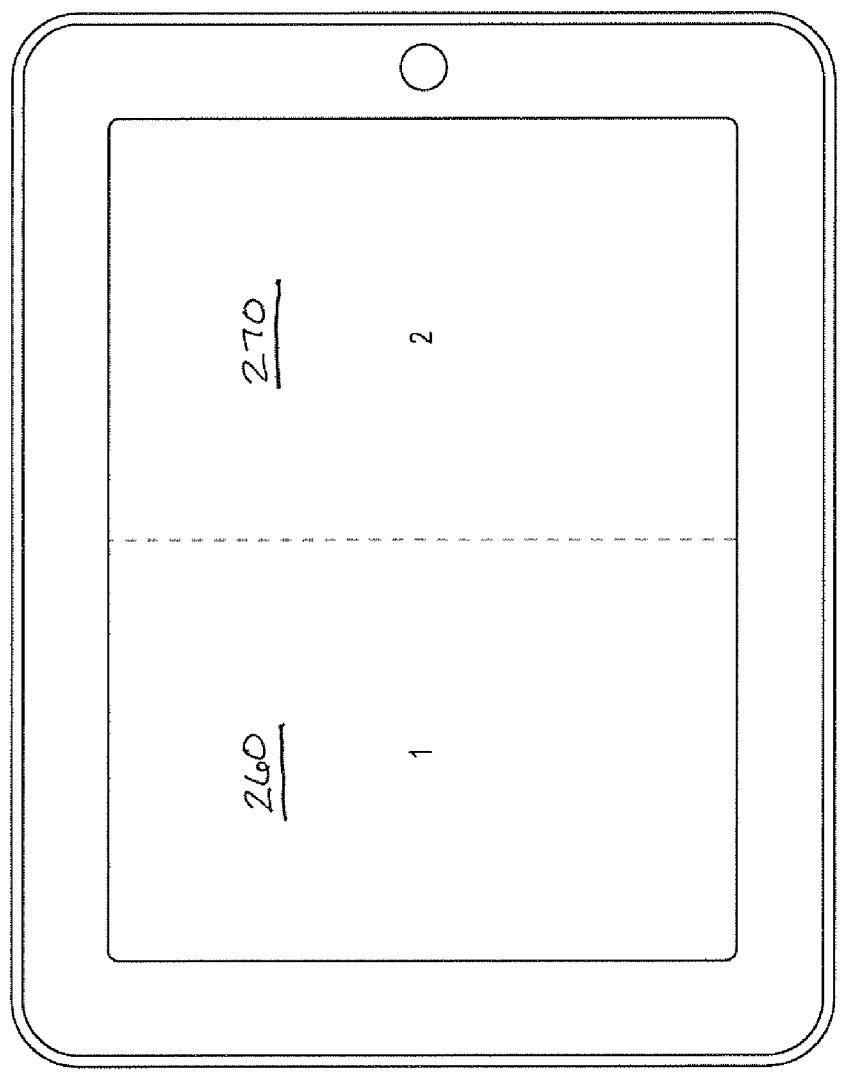
Figure 20:
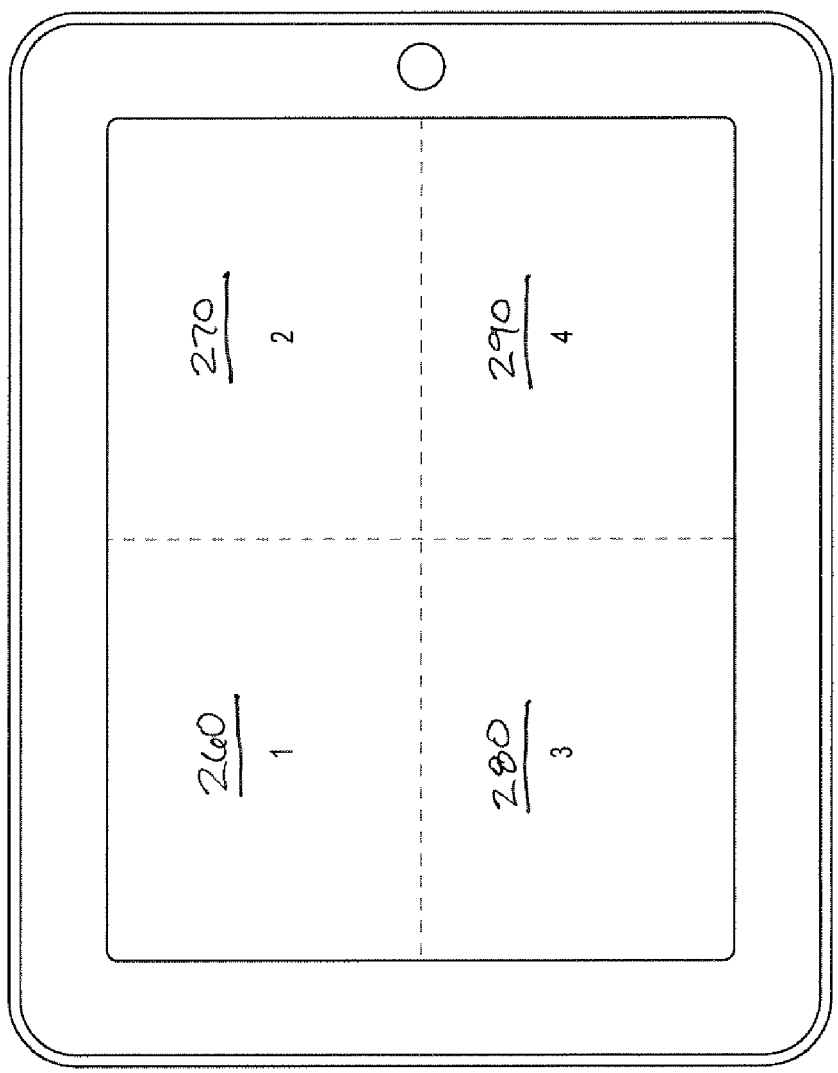
Figure 21:
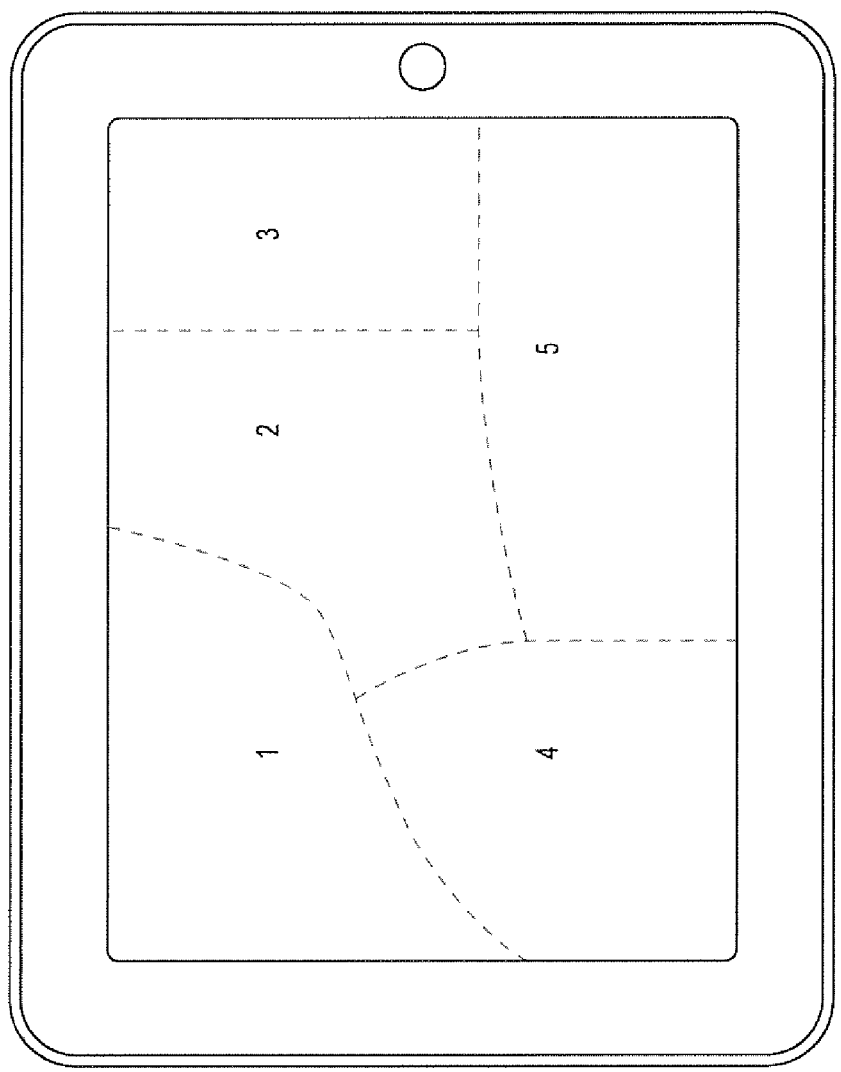
Figure 22:
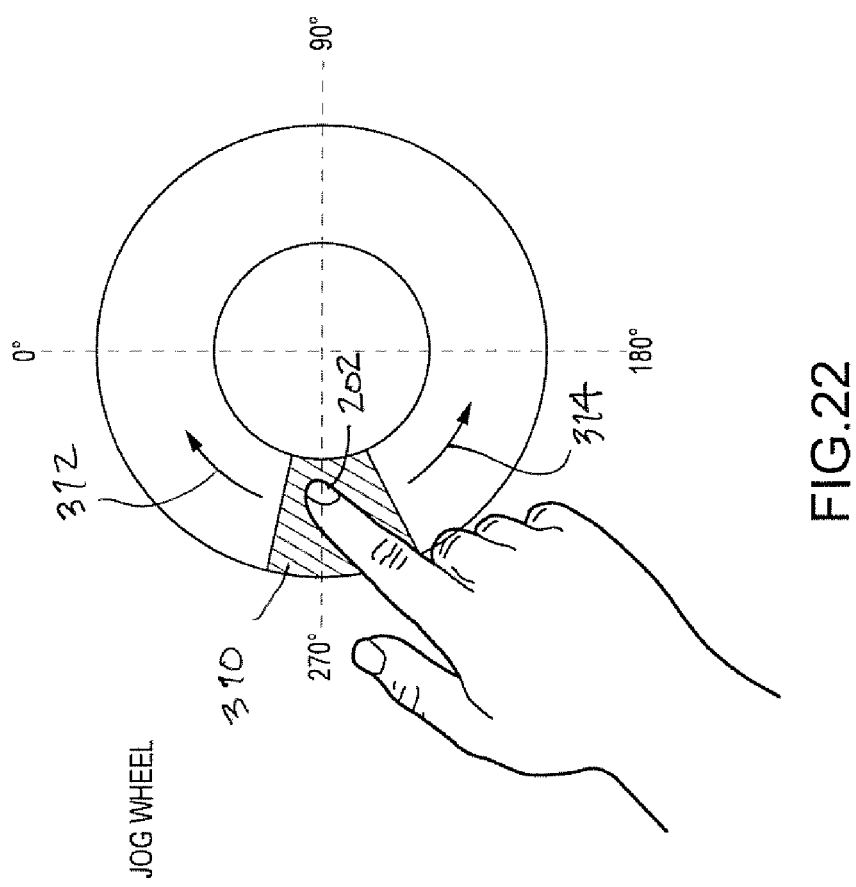
Figure 23:
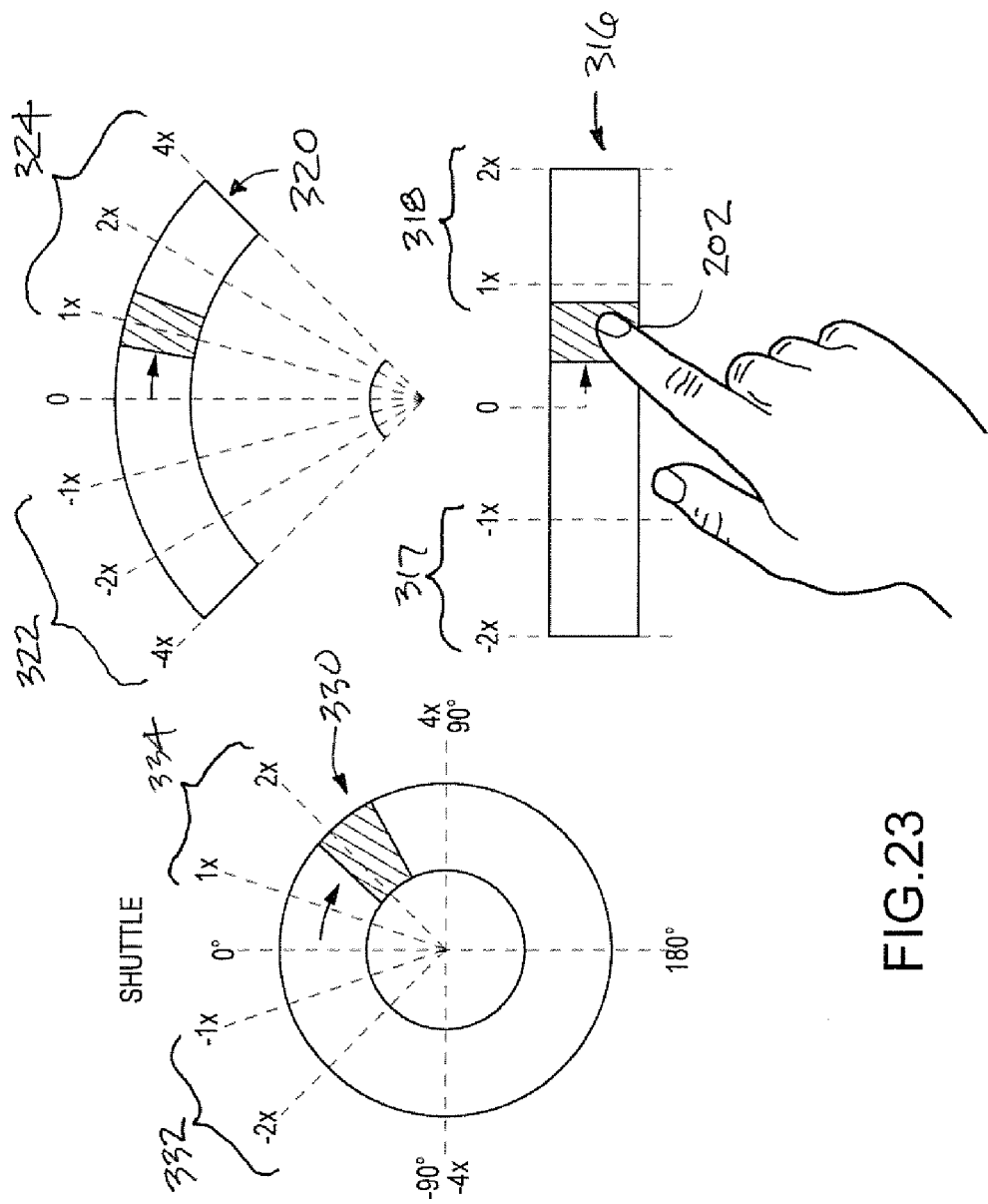
Figure 24:
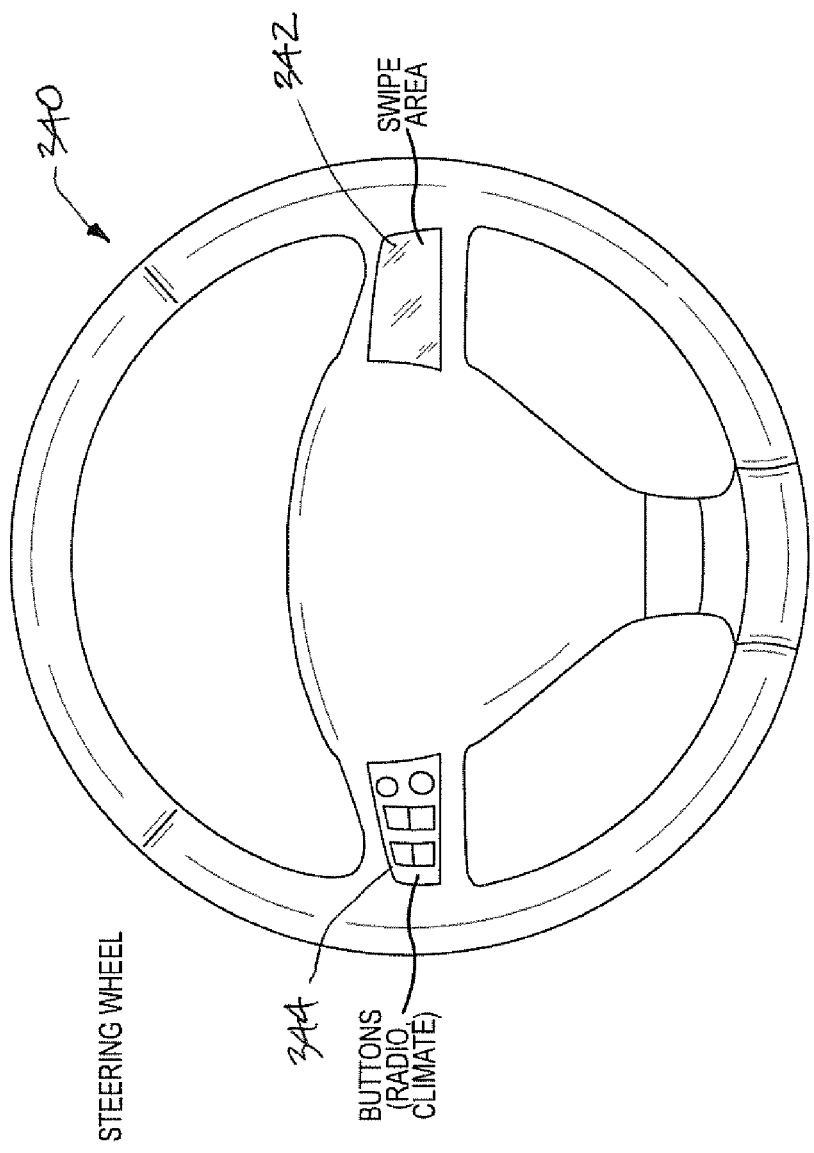
Figure 25:
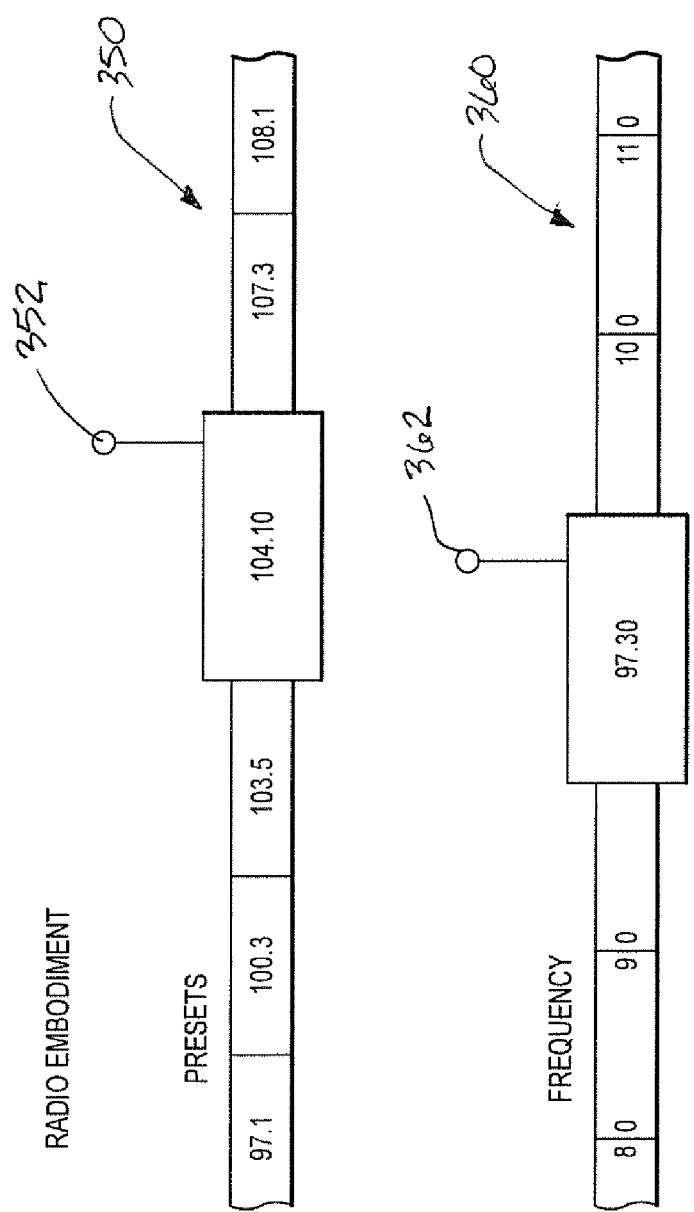
Figure 26:
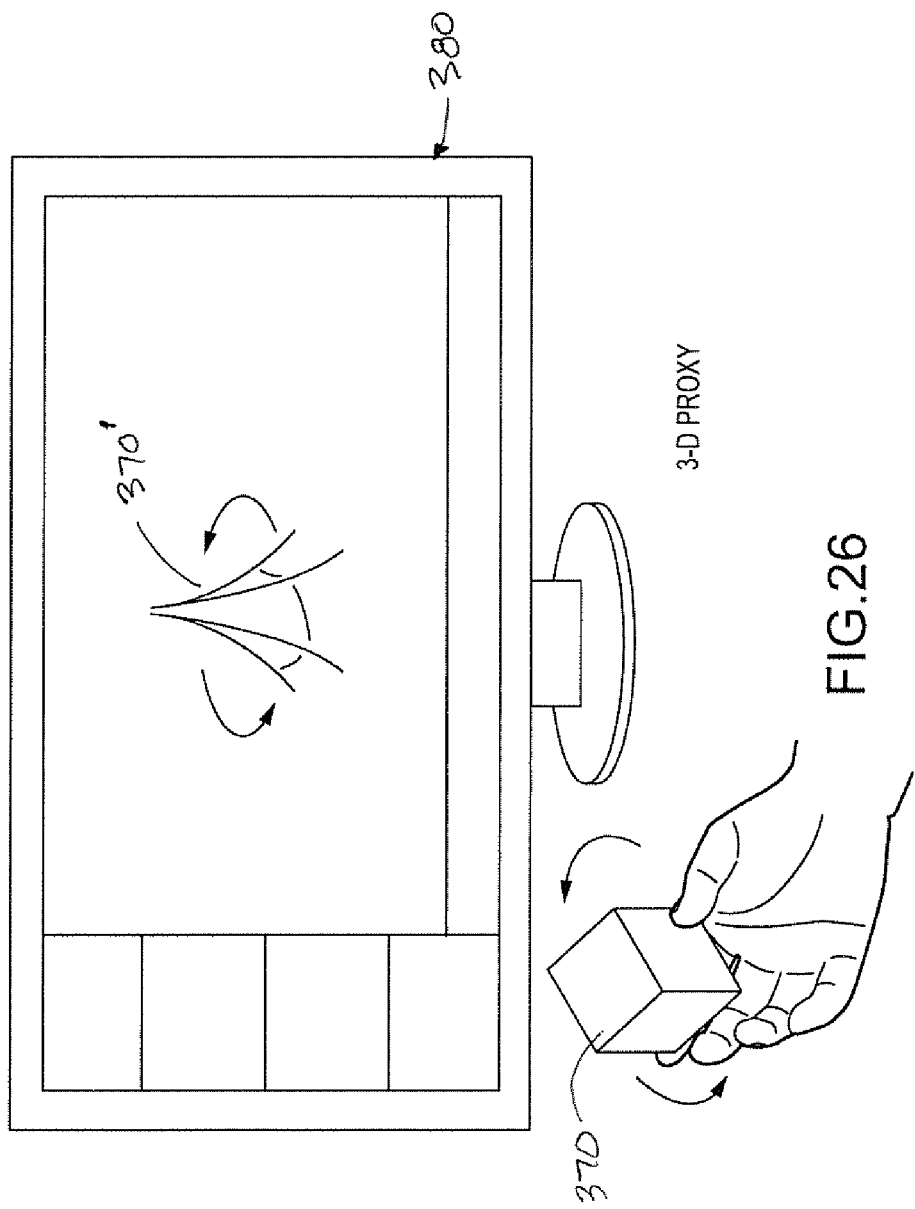
Figure 27:
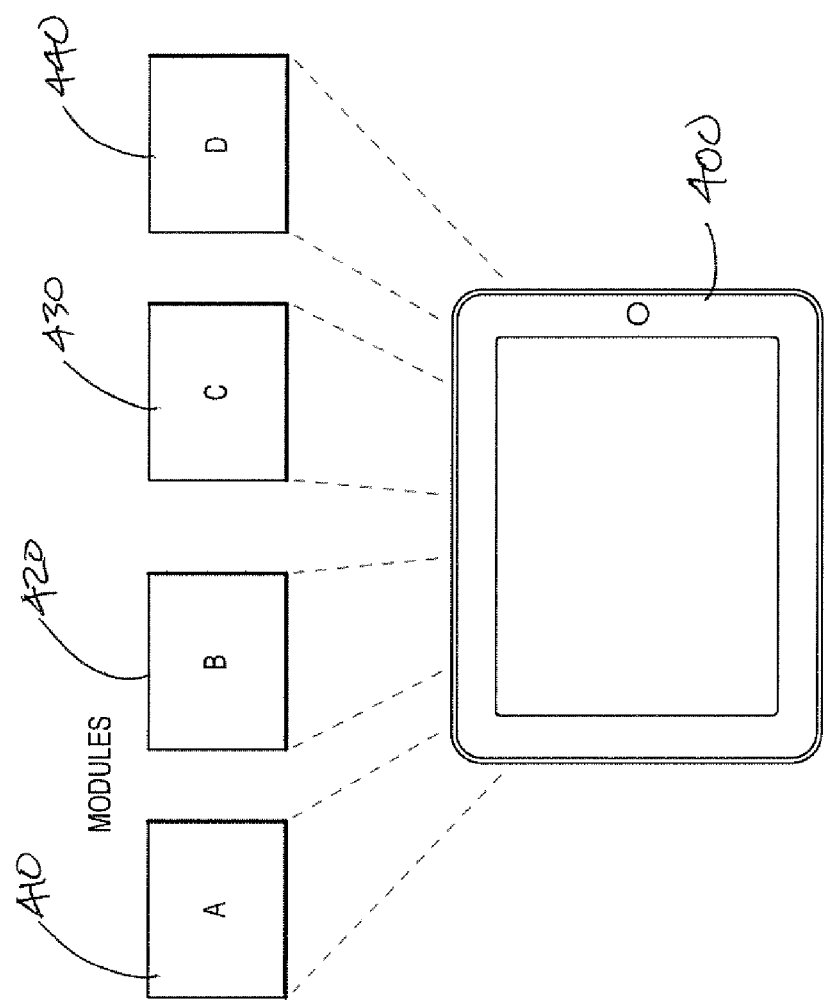
Figure 28:
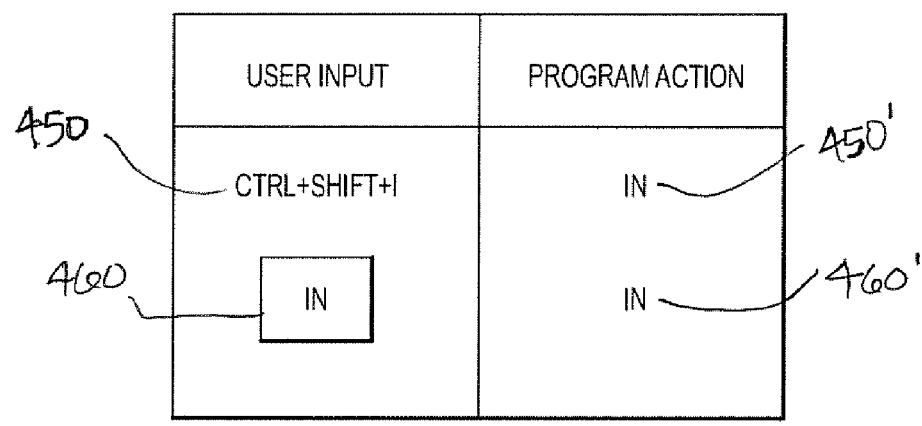
Figure 29:
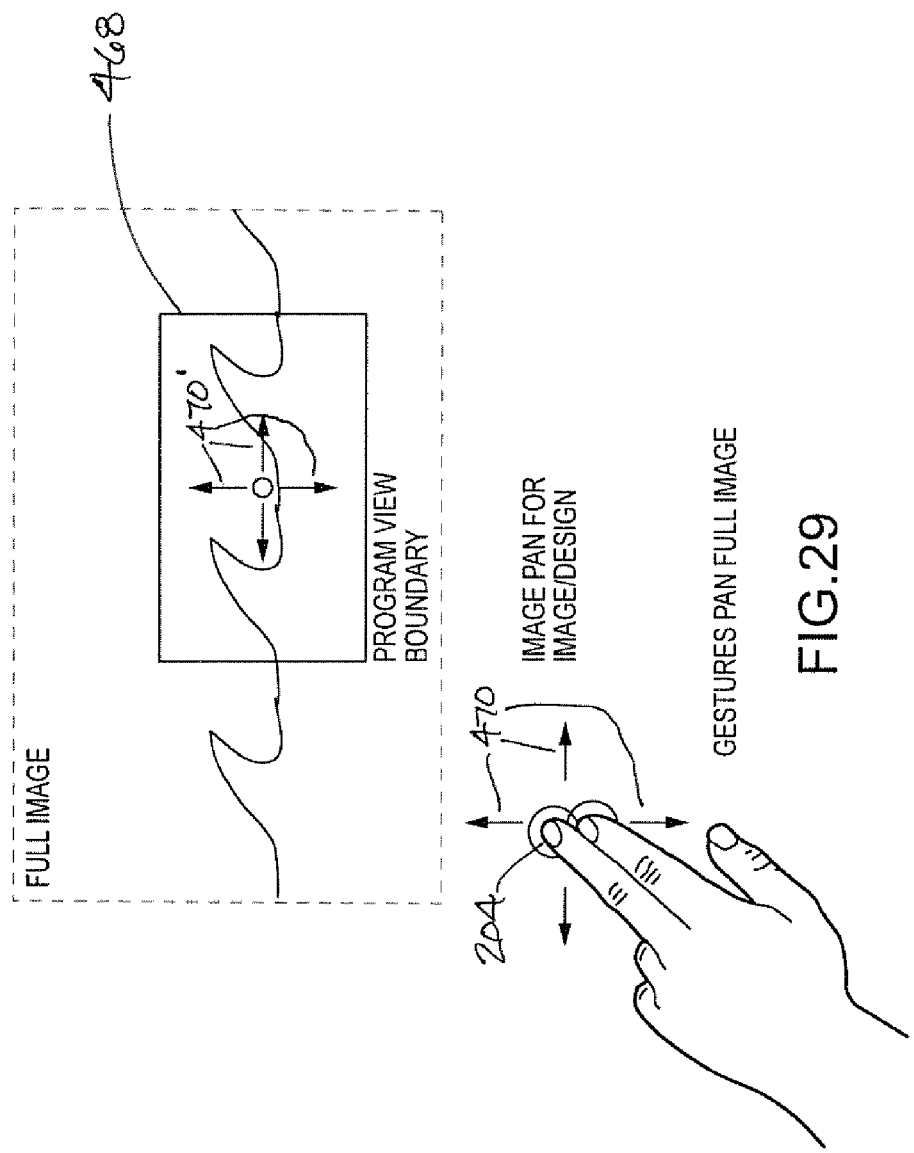
Figure 30:
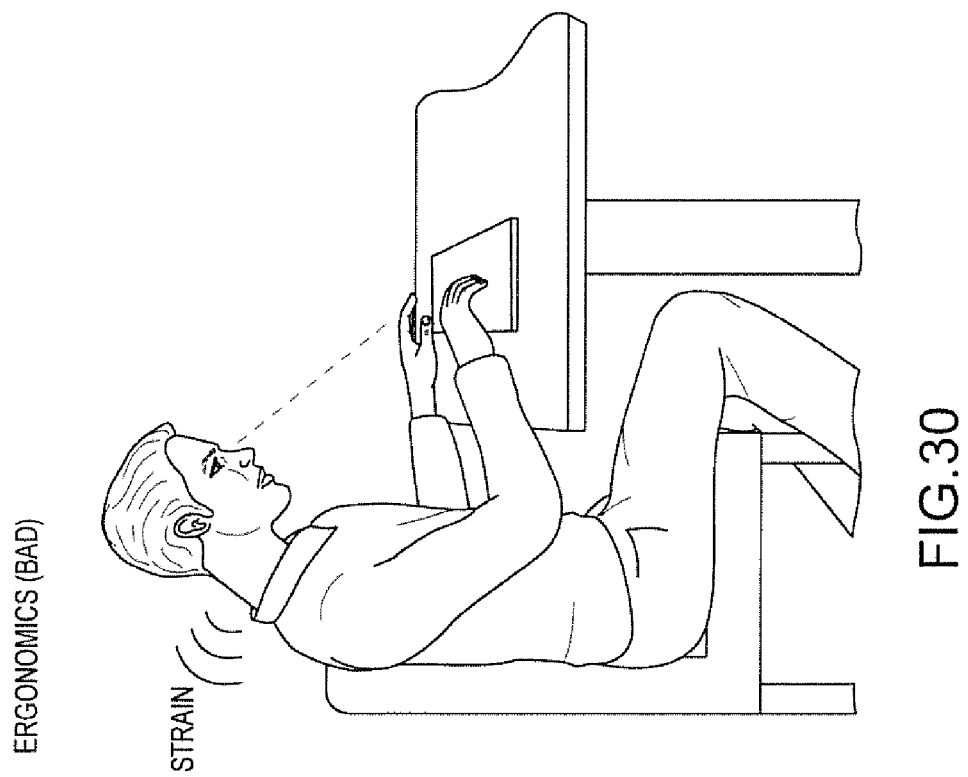
Figure 31:
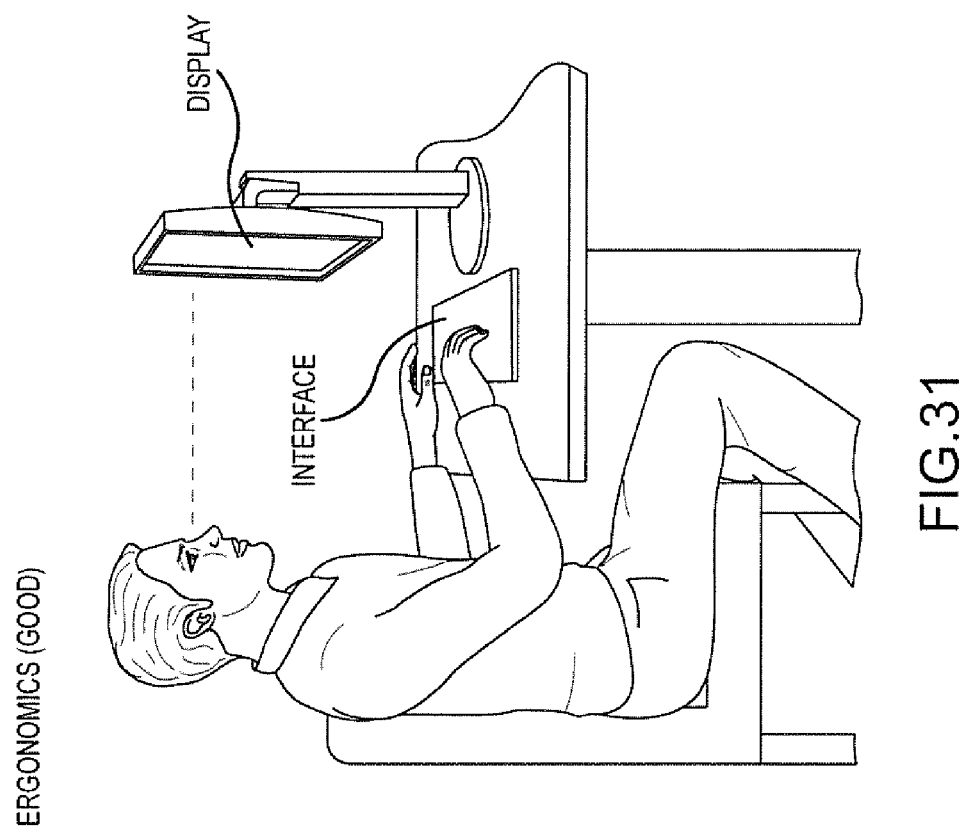
Figure 32:
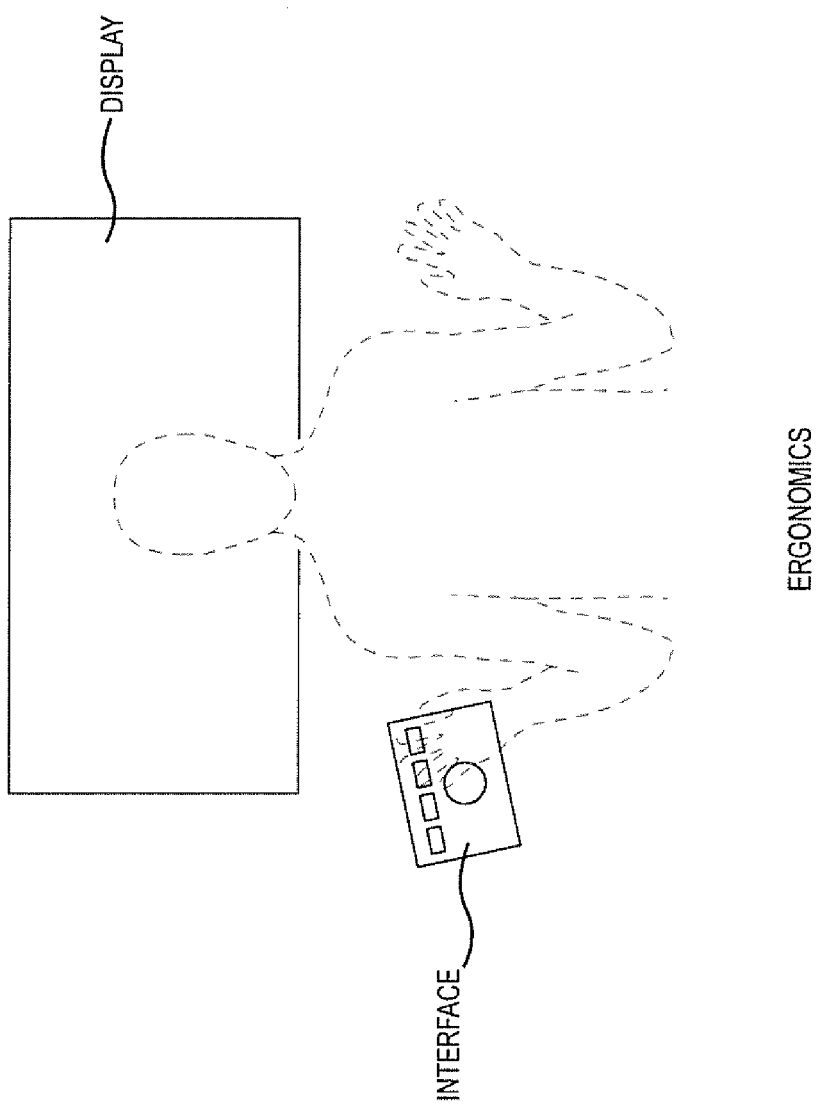
Figure 33:
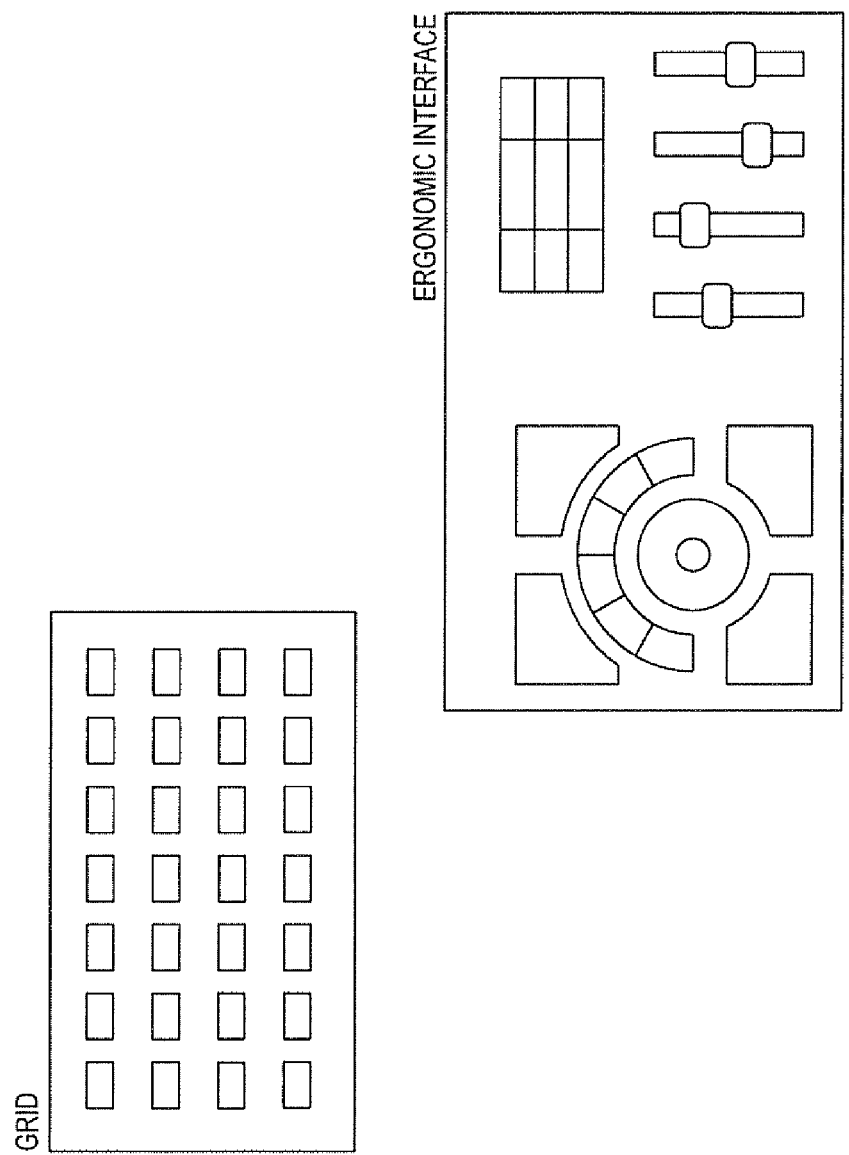

FIG. 12 is a plan view of a specific customized interface according to yet another embodiment of the present disclosure;

FIG. 13 is a diagram showing one possible movement-based command associated with a particular icon or button according to any of the embodiments shown in the preceding Figures;

FIG. 14 is a diagram showing another possible movement-based command associated with a particular icon or button according to any of the embodiments shown in the preceding Figures;

FIG. 15 is a diagram showing yet another possible movement-based command associated with a particular icon or button according to any of the embodiments shown in the preceding Figures;

FIG. 16 is a diagram showing yet another possible movement-based command associated with a particular icon or button according to any of the embodiments shown in the preceding Figures;

FIG. 17 is a diagram showing additional movement-based commands associated with a particular icon or button according to any of the embodiments shown in the preceding Figures;

FIG. 18 is a diagram showing yet another possible movement-based command associated with a particular icon or button according to one particular embodiment;

FIG. 19 is a diagram showing multiple movement-based zones associated with a particular interface and according to any of the embodiments shown in the preceding Figures;

FIG. 20 is another diagram showing multiple movement-based zones associated with a particular interface and according to any of the embodiments shown in the preceding Figures;

FIG. 21 is another diagram showing multiple movement-based zones associated with a particular interface and according to any of the embodiments shown in the preceding Figures;

FIG. 22 is a diagram showing a jog wheel and movement-based commands associated with a particular interface and according to any of the embodiments shown in the preceding Figures;

FIG. 23 is a diagram showing a shuttle and movement-based commands associated with a particular interface and according to any of the embodiments shown in the preceding Figures;

FIG. 24 is a diagram showing multiple movement-based commands associated with a particular interface located on a steering wheel;

FIG. 25 is a diagram showing multiple movement-based commands associated with a particular interface used for setting a radio frequency or a temperature;

FIG. 26 is a diagram showing a three-dimensional proxy and movement-based commands associated with the proxy;

FIG. 27 is a diagram showing modules associated with a particular interface according to any of the embodiments described in the preceding Figures;

FIG. 28 is a diagram showing user input commands and associated functions for a traditional keyboard shortcut and an icon-based shortcut;

FIG. 29 is a diagram showing multiple movement-based commands associated with a particular interface for panning across an image on a display; and FIGS. 30-33 are diagrams showing ergonomic considerations for the placement and operation of a particular interface according to any of the embodiments described in the preceding Figures.

DETAILED DESCRIPTION

Various embodiments of the present disclosure are shown in FIGS. 1-33. According to one embodiment of the present disclosure, a custom interface may comprise a plurality of icons or buttons for communicating with at least one computational apparatus for use in video editing, such as the interfaces shown in FIGS. 1-12. According to this embodiment, a computational apparatus such as a laptop computer may host an application for a user to achieve video editing (i.e., a video editing software application). In this embodiment, the application may permit a user to view one or more videos on the computer via one or more windows, and the application may further include a timeline in a bar graph format on the computer display screen. Although the application resides on the computer and contains software programming code to receive inputs directly from the keyboard of the computer, a user may prefer to use an alternative, custom designed interface, such as a touch screen device or tablet. Residing on the tablet is a user customized application, which comprises an interface designed to communicate with (i.e., provide inputs to) the video editing application.

In order for the computer and video editing application to be permitted to receive the inputs from the tablet, the user must establish a wired or wireless connection, which according to a preferred embodiment may be a private Wi-Fi network. According to a preferred embodiment, the messaging protocol for the connection between the computational apparatus and the interface (in this example, the laptop computer and the tablet) is via a midi protocol. In an alternative embodiment, the messaging occurs over an OSC protocol. Other messaging protocols may be employed without deviating from the spirit of the present disclosure, so long as the messaging protocol permits time-sensitive and/or low-latency transfer of the inputs received from the interface to the computational apparatus hosting the application.

Once the communication between the interface (tablet) and the computational apparatus (laptop computer), has been established, the user can begin operating the destination application through the alternative interface. The user can then begin customizing the icons or "buttons" for use in communicating with the computer and thereby to the application residing thereon. Alternatively, the customized user interface may have already been created and programmed without requiring the user to orient or assign customized control features to any of the buttons displayed on the interface.

This toolkit may in the preferred embodiment work similar to "modules" where one interface layout can easily be switched with another one for different tasks and/or programs. In the embodiment of video editing, one can have a layout with buttons focused on basic three-point editing (In, Out, Insert, etc.) and another can have a layout focused on color correction with buttons and interfaces (i.e. three color correction wheels, shadows, mids, highlights). These can be arranged in order of the most common tasks in the process to be done sequentially, while also allowing users to access these modules directly in a non-sequential order according to the user's or application's needs. Several examples of arrangements for a task such as video editing are shown in FIGS. 1-12.

Modules within the toolkit also may be able to be switched using gestures, which in the preferred embodiment would be a 4 finger swipe to the right or left. In other embodiments the modules may be selectable to permit other types of user-specified gestures on the touch screen, including but not limited to those described in FIG. 17.

In certain embodiments, particularly those for use in video editing applications or video playback, one of the buttons may comprise a jog wheel. The jog wheel is preferably round in shape and may be hemispherical or semi-hemispherical depending on the application and the user preference. According to the present embodiment (and the particular embodiments shown in FIGS. 1-10), and referring in particular to FIG. 5, the jog wheel 30 allows a user to place his or her finger(s) on the path of the jog wheel 30 and move the user's finger in a defined circle, which may be assigned to the command of moving the location of the video either forward or backward, depending on the direction the user is dragging his or her finger. See FIGS. 22-23. The circular movement is recommended due to the nature of having infinite revolutions in a finite space that can allow one to move forward or backwards through video of infinite length.

The jog wheel is preferably associated with a single finger touch command 202, which follows a generally circular path 200 contiguous with the circumference of the jog wheel, as best shown in FIG. 13. The circle motion along the jog wheel 30 also permits the user to alter the rate of the movement for precise control of the video when seeking specific frame accuracy. The speed at which finger movement may be linked to video movement may be linear (ie. 10 radians corresponding to 10 frames of movement in video) or may be non-linear, and the video movement speed may ramp up with time or faster circular movement of the finger (ie. 10 degrees initially corresponds to 10 frames of video movement but with continued movement (time, speed, or number of revolutions) may increase to 10 degrees corresponding to 20 frames of video movement). In a preferred embodiment, the user may move his or her finger in a clockwise manner to move the video forward (as shown in FIG. 13), and in a counterclockwise manner to move the video backward. Other commands may be accomplished by varying the number of fingers and/or the direction of the gesture, as shown in FIGS. 14-16.

In certain embodiments, particularly those for use in video editing applications or video playback, one of the buttons may comprise a shuttle 60. This is a method, similar to the jog wheel 30, of moving through footage. In this embodiment, the shuttle 60 permits a non-linear increase or decrease in video movement speed by way of locating a slide button 62 relative to the shuttle 60 (i.e., relative to the length of the shuttle button, which in a preferred embodiment is generally arcuate in shape). Shuttle 60 generally allows for movement at greater speed than the jog wheel. The shuttle may be round in shape, hemispherical, semi-hemispherical, arc or straight line shape depending on application and user preference.

According to this particular embodiment, the shuttle 60 allows a user to place his or her finger on the path of the shuttle 60 and move the user's finger in a defined or undefined path, which may be assigned to the command of moving the location of the video either forward or backward, depending on the direction the user is dragging his or her finger. In the embodiment of a round-in-shape, hemispherical, semi-hemispherical or arcuate path, the user may easily modulate the playback speed by the change in rotation. The greater the rotation, the faster the video plays back and fast forwards or rewinds.

In a preferred embodiment, and as illustrated in FIG. 23, the user may rotate the round-in-shape, hemispherical, semi-hemispherical or arcuate path 10 degrees for normal 1x playback. Moving the finger and path 20 degrees from the initial point may correspond to 2x playback. Each increase of 10 degrees from the initial point may in this embodiment double the playback speed in the direction of movement, which the user may establish if selecting this particular module for the application at hand.

The amount of movement and amount of video playback speed may be adjusted according to application or user preference. The variables described above may range from distinct steps or of infinite degrees of movement. In one embodiment, clockwise movement corresponds to forward play back, whereas counter clockwise movement corresponds to reverse play back. In addition to round-in-shape, hemispherical, semi-hemispherical or arcuate path, the path may be substantially straight or linear paths. The arcs may be of any length and radius. Straight or linear paths may also be of any length. Instead of degrees or rotation, playback speed forward and reverse are achieved in change along the path.

Figure 1:
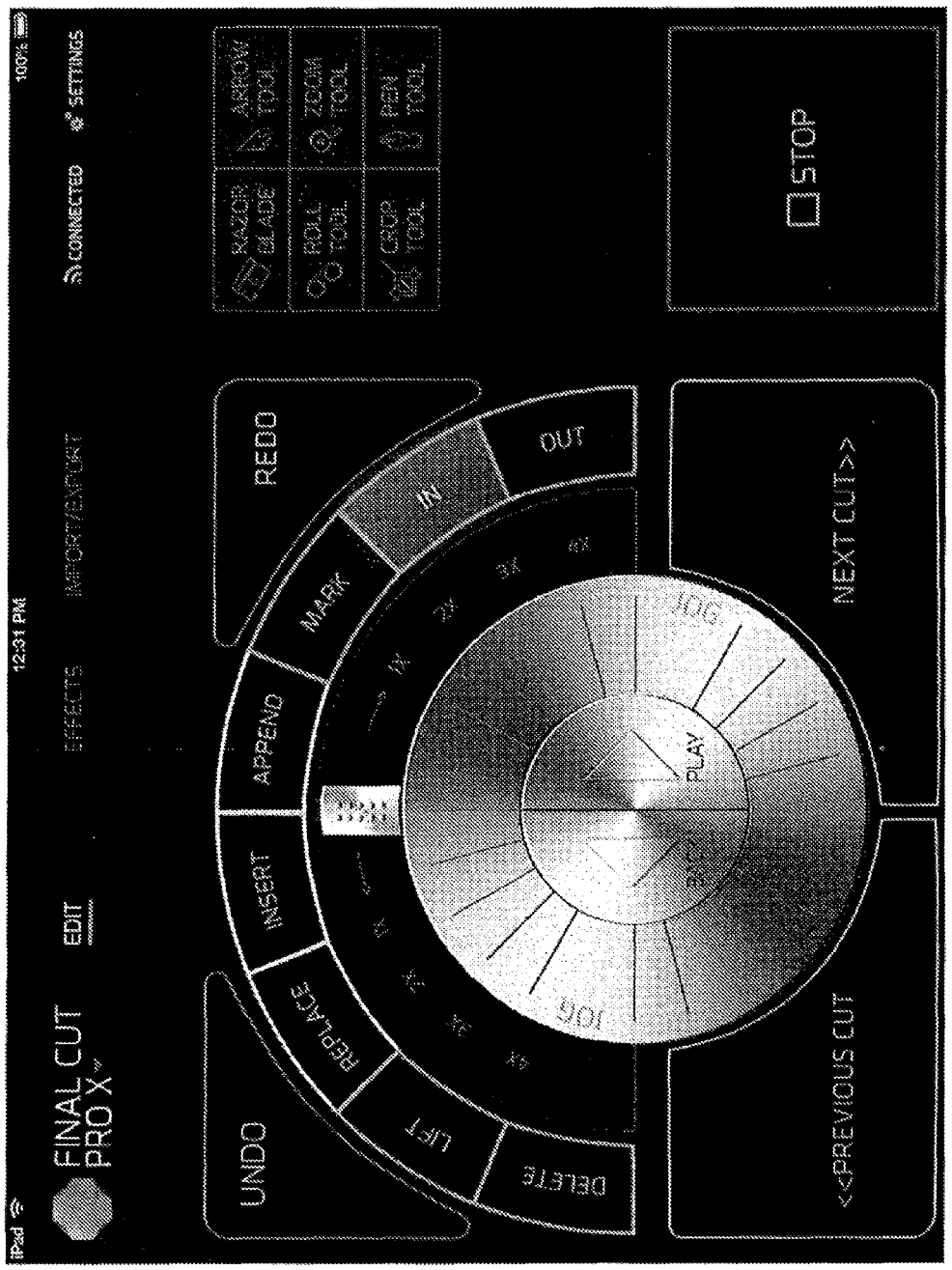
Figure 2:
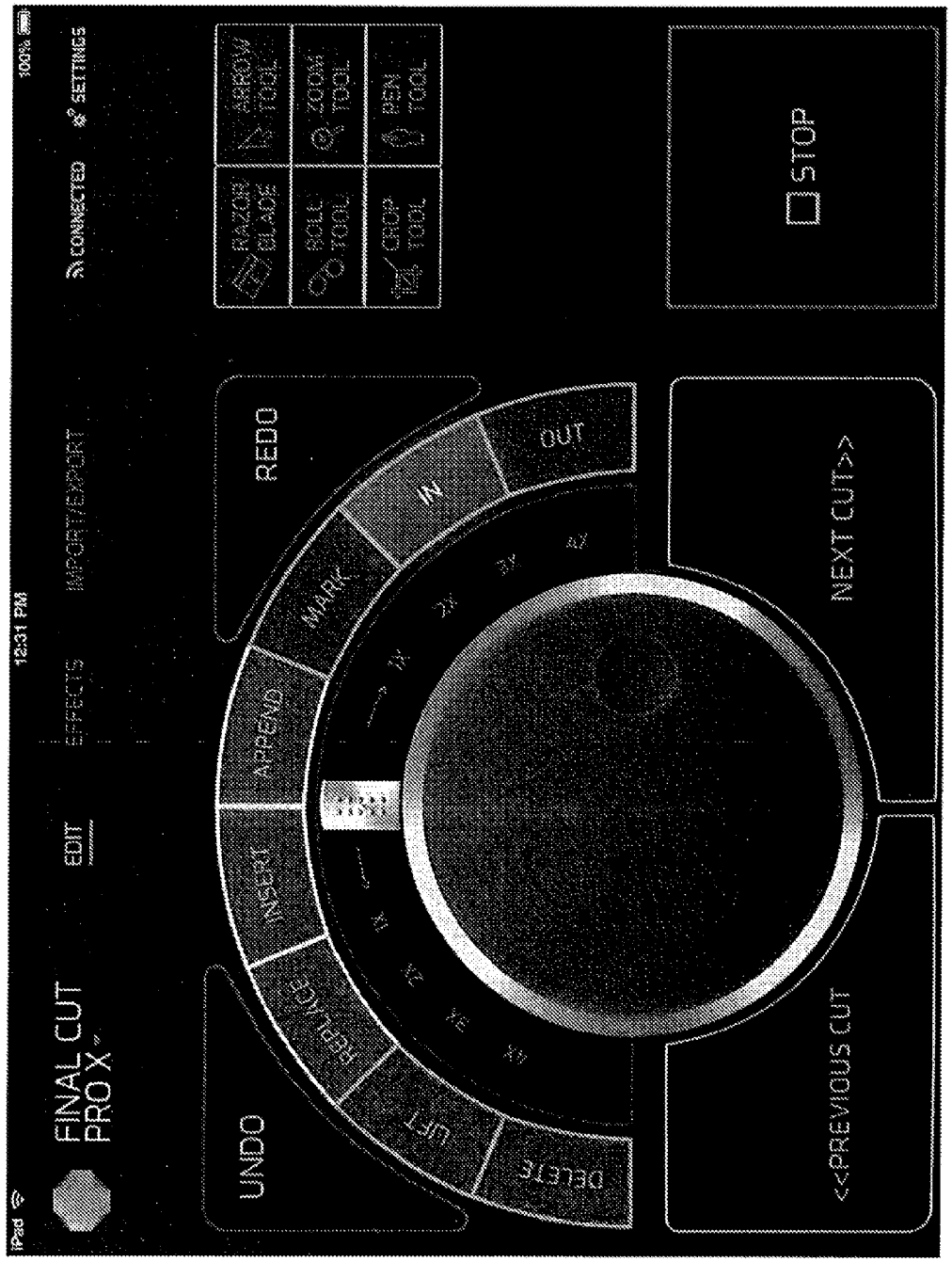
Figure 3:
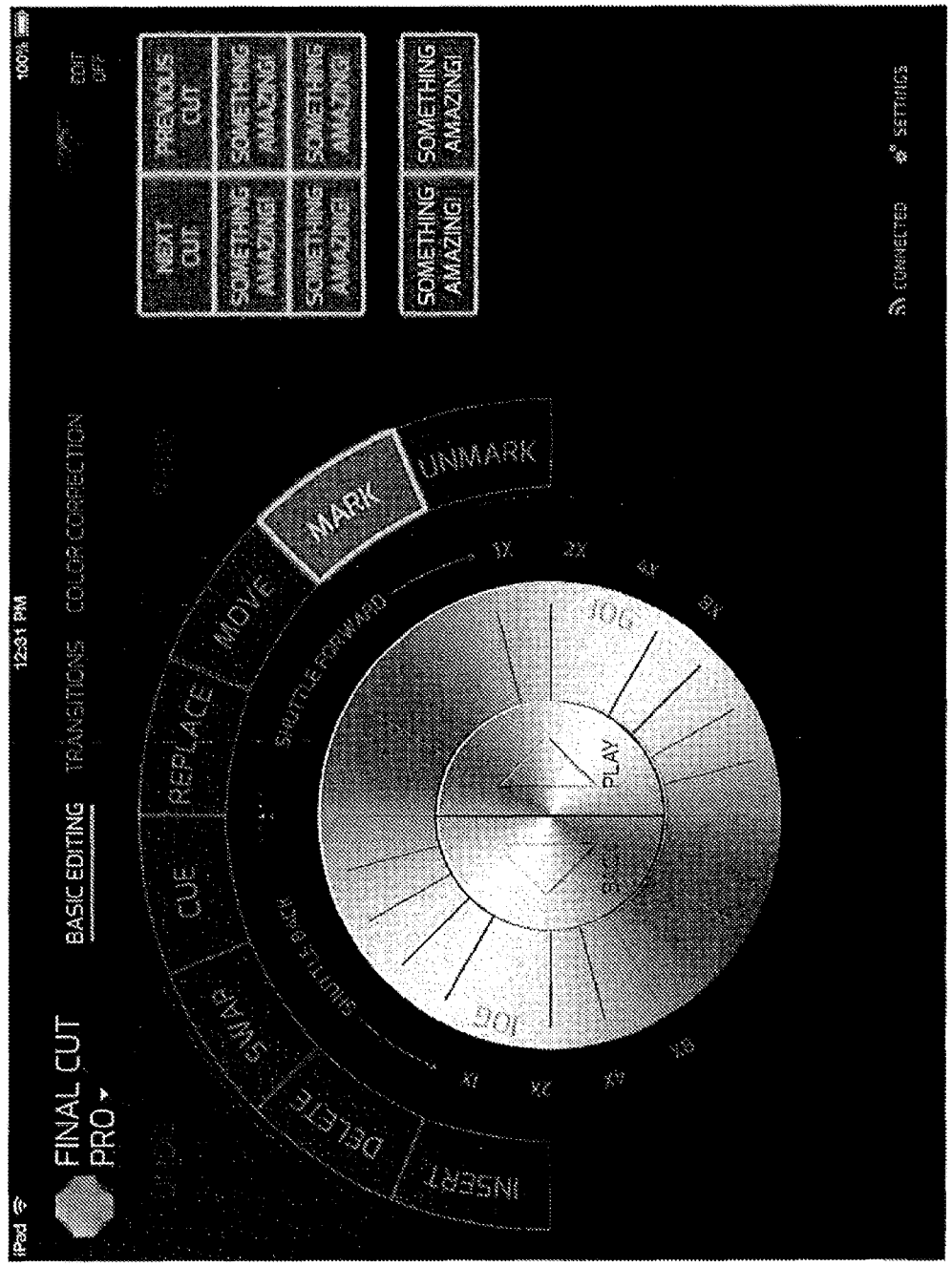
Figure 4:
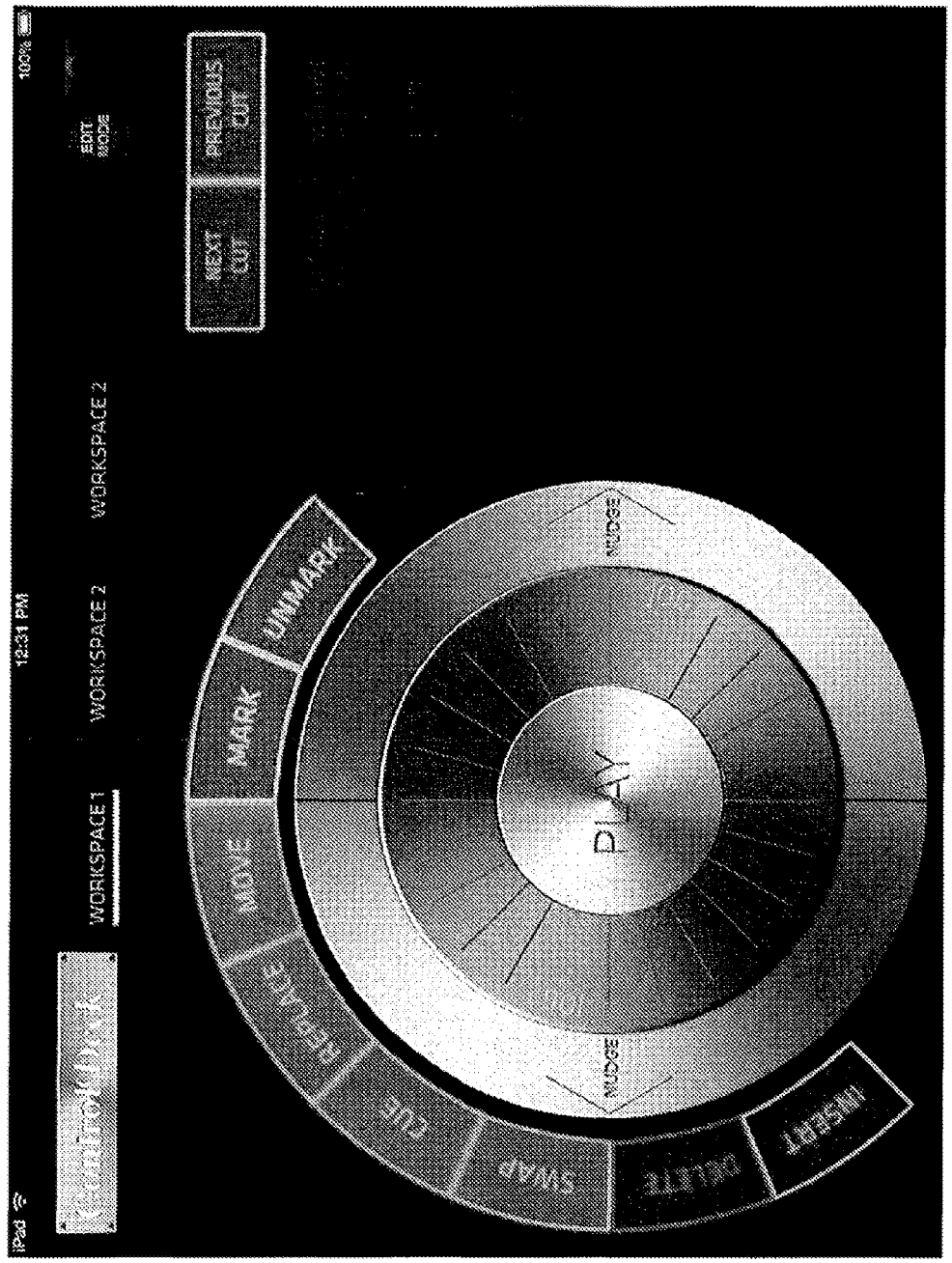
Figure 5:
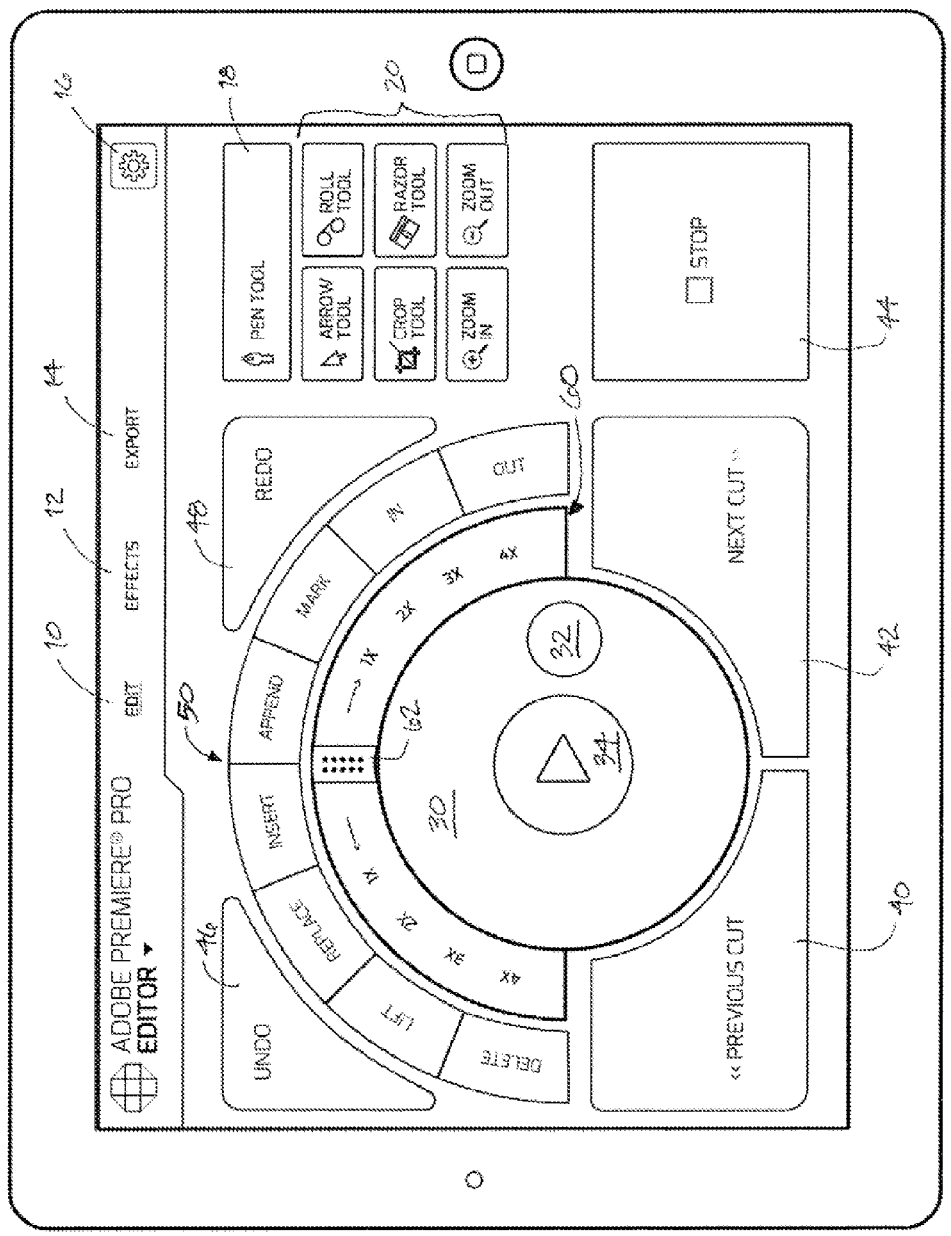

Other icons or buttons are also shown in FIG. 5. For example, buttons may include a toggle switch to a previous clip or cut 40 or a next clip or cut 42. Tools 18, 20 may also be provided for use in achieving particular tasks, such as making annotations while the editing process is ongoing. Buttons such as Edit 10, Effects 12 or Export 14 may also be included to achieve a simple task quickly and efficiently. Other common tasks such as Stop 44, Play 34, Undo 46 and Redo 48 may also be included in the toolkit. Lesser used tasks, such as those shown in array of buttons 50 located above shuttle 60, may also be included as desired.

Figure 6:
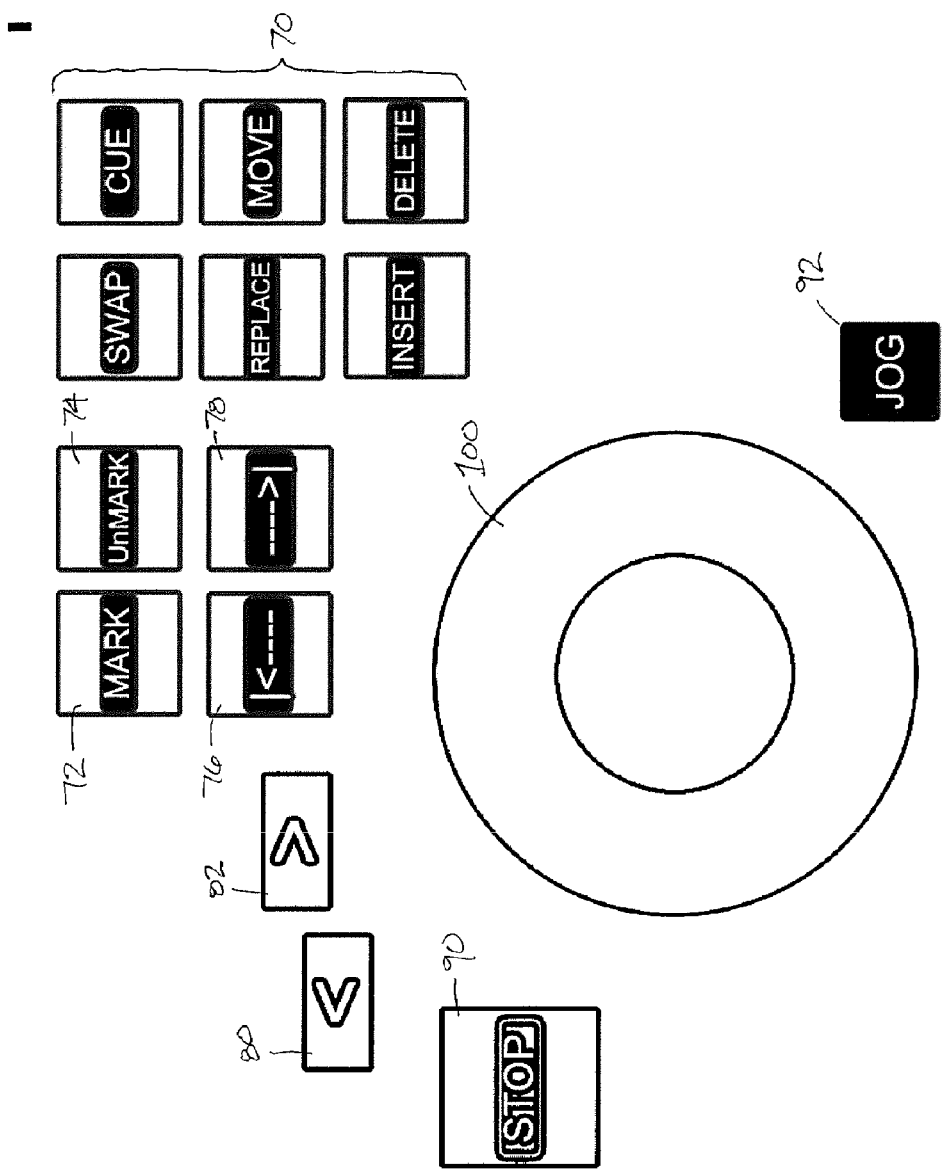
Figure 7:
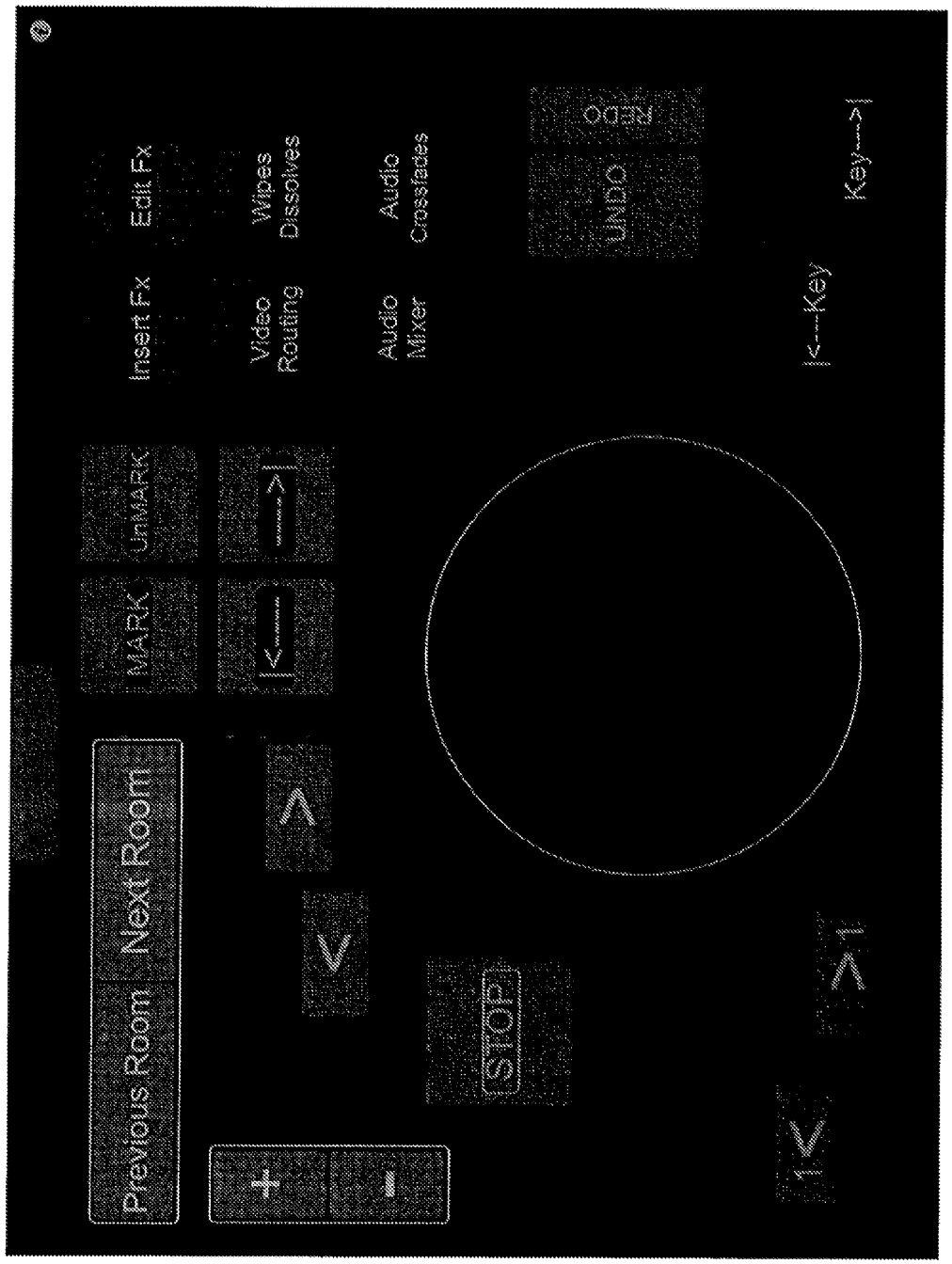
Figure 8:
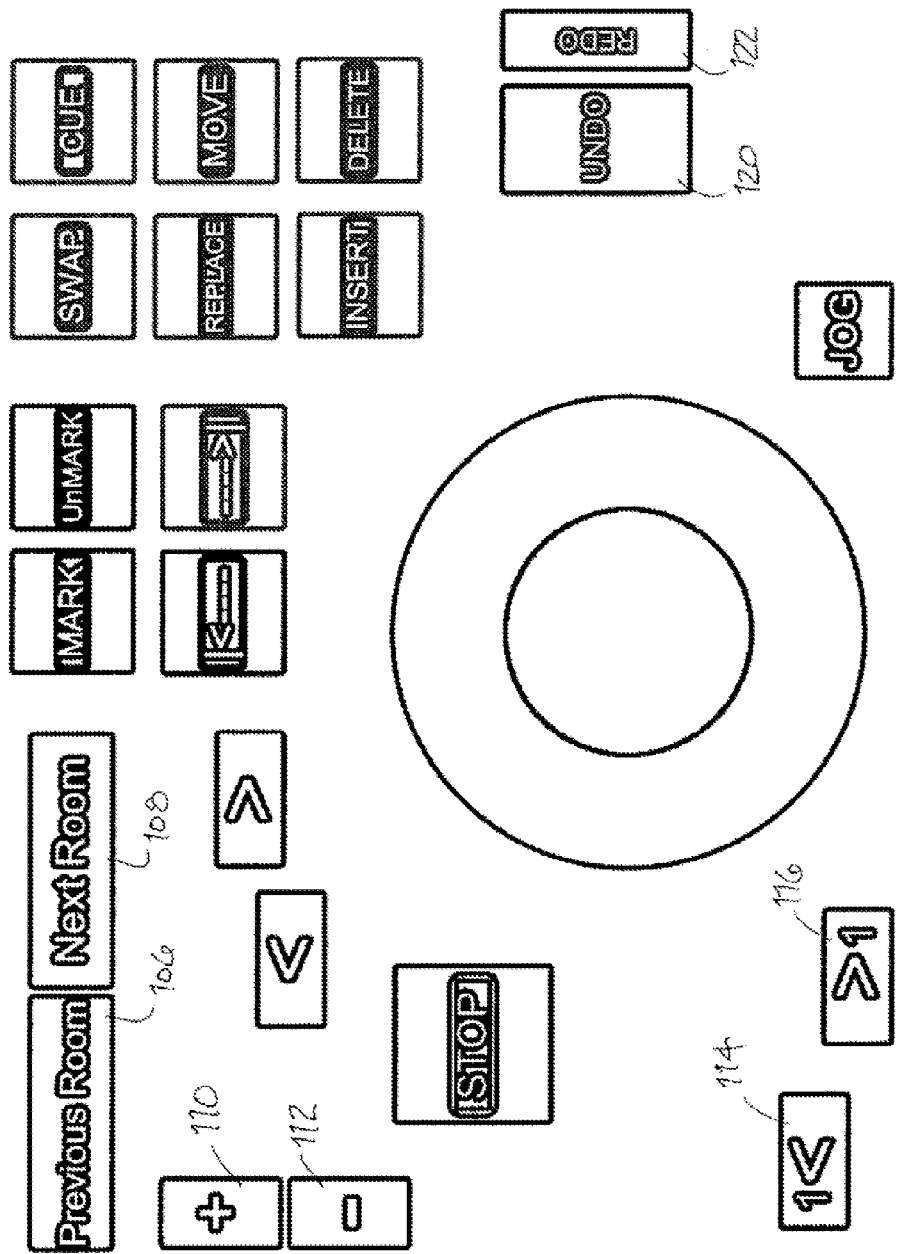
Figure 9:
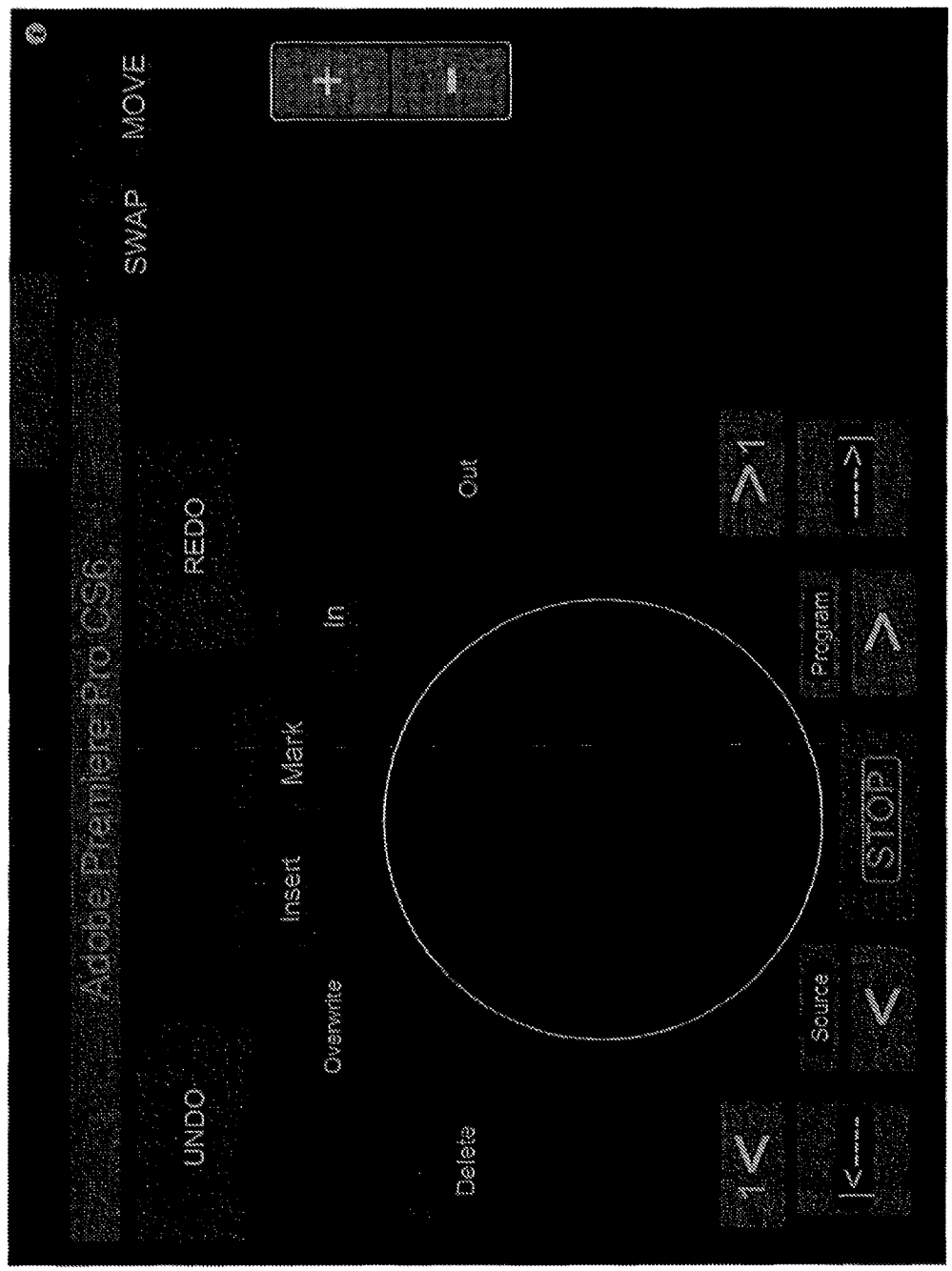
Figure 10:
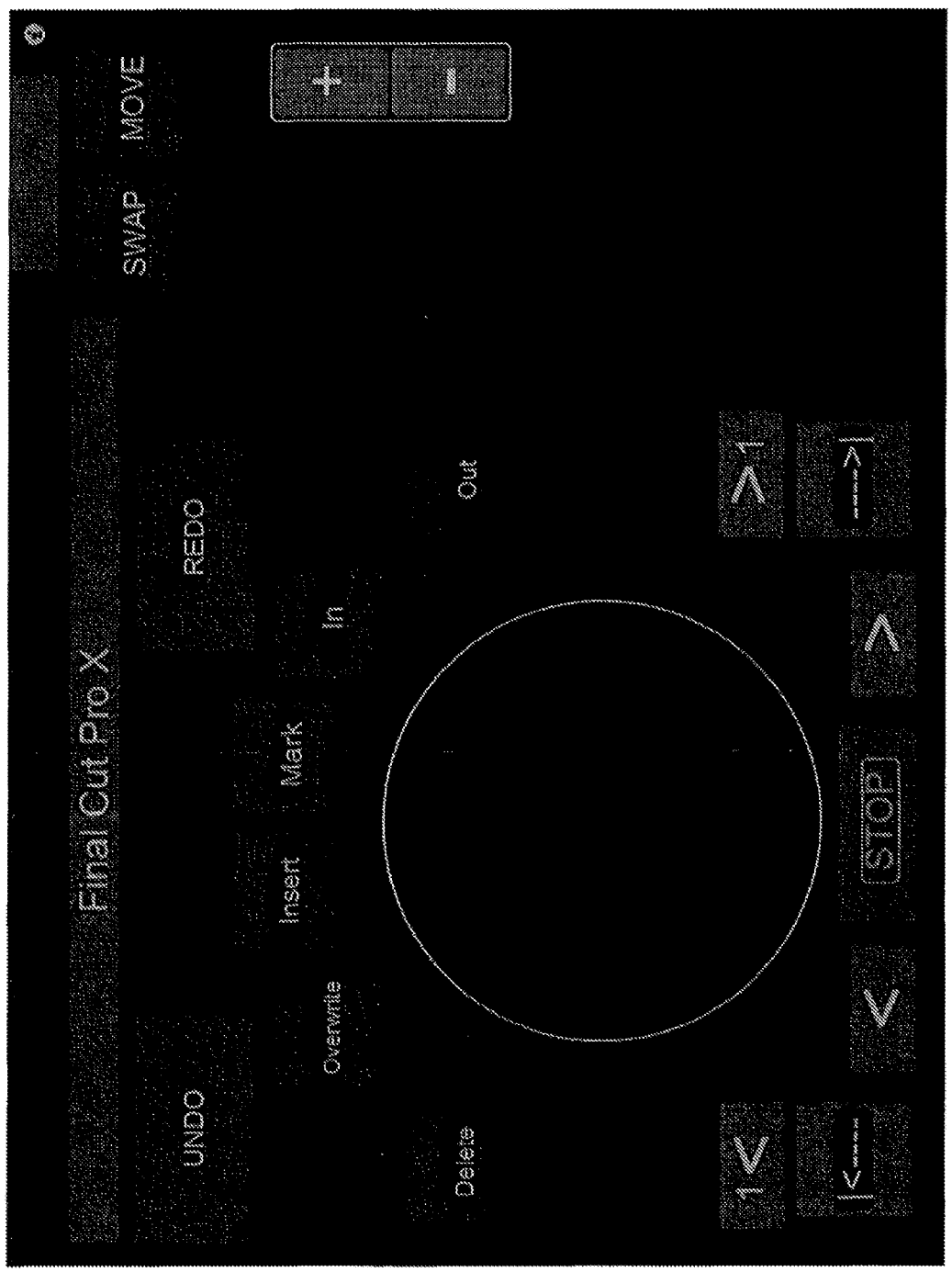
Figure 11:
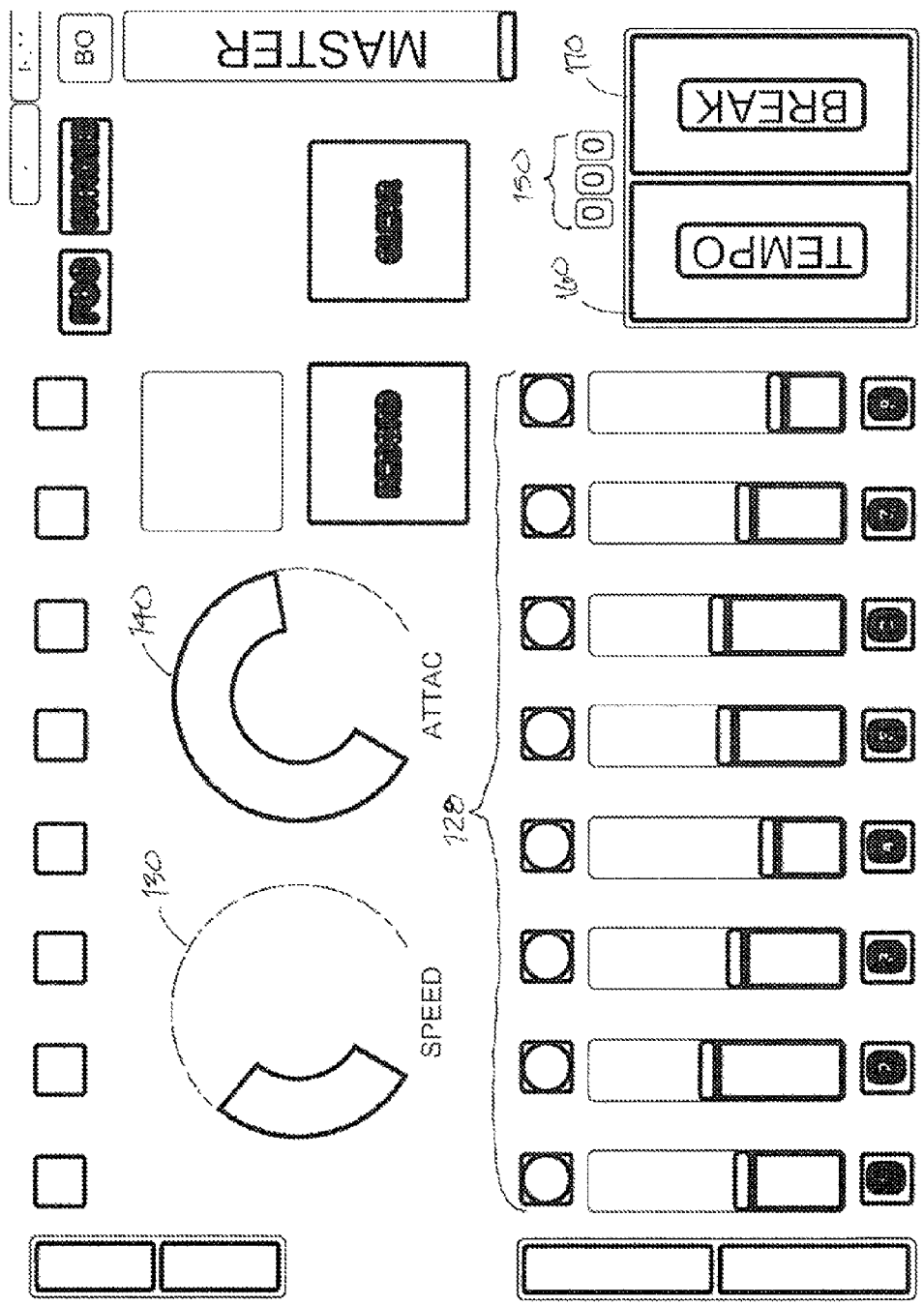

According to one embodiment, a gesture right plays forward and left plays back. Other embodiments may use an invisible interface or gesture to accomplish the same task. Referring now to FIG. 6, another embodiment may be where a user begins on an icon, such as a >icon 82, and drags the button to the right or left for increasingly faster playback. In preferred embodiments, the user may stop the playback by simply lifting the finger off the touch screen or interface. A marker may serve as a visual feedback, in addition to or along with vibration or audible feedback from the touch screen device that playback has returned to the stop position when the finger is released.

The communication between the jog wheel or shuttle (and the user input being directed thereon) and the computational apparatus permits the command from the interface to be received by the application (here, the video editing program). As opposed to a user having to select another keystroke or input another command to stop the video from moving forward or backward, the interface permits the user to simply remove his or her finger to stop the video. Certain tasks may be replaced by a static button, such as Mark, 72, UnMark 74 or Jog 92. Other functions or tools may be represented by other buttons 70, including the Previous Room 106, Next Room 108, "+" 110 and "−" 112 buttons shown in FIG. 8. In a preferred embodiment, each one of these buttons is labeled according to the functionality the particular button has, and may replace the user's shortcut keystroke operation of certain commands on the keyboard of the laptop computer. The labels for the buttons are therefore designed to be intuitive to a new user and more efficient than a traditional keyboard, and may incorporate words and/or graphics or other differentiators, which may include texture or sound feedback. The jog wheel 100 or shuttle may also be programmed to receive different types of finger or hand-based movement commands, including but not limited to those shown in FIGS. 13-16.

In certain embodiments, such as in audio editing software, the interface may contain faders or sliders 128 that allow the user to adjust volume of various channels in a multi-touch environment. This allows the user to operate multiple sources of sound simultaneously when mixing sound effects and background music among other sources. This type of button arrangement would allow live mixing of sources, which is beneficial to video editors, sound designers and DJ's.

In certain embodiments, such as image manipulation or graphic design, users are often working in magnified views to adjust detailed aspects of their image or design. This often creates a difficulty in altering view which currently requires a combination of keyboard presses and use of the mouse to switch between zoom and panning the image to get to the desired view. In this embodiment, the tablet interface can be used for that task allowing the user to pan, using a two finger swipe gesture in any direction that is linked to the image pan on the computing device. In another embodiment, a pinch-to-zoom gesture used in connection with the application may adjust the zoom level in the computing device application. This allows the user to control the view separately from the use of a mouse or pen input, allowing for true two handed approach to image manipulation.

Referring now to FIG. 28, a variety of shortcut commands may be integrated into the touch screen and affiliated buttons. One example, as shown in FIG. 28, is for a command associated with a physical keyboard combination of "CTRL," "SHIFT" and "I" to command the control "IN." By creating a button associated with this task, the command is greatly simplified and does not present problems for the user when attempting to achieve the command with a single hand (i.e., manipulating multiple keys on a physical keyboard versus selecting a single icon on a touch screen). By way of further example, if a user presses a button marked "End" on the interface, that operation executes a shortcut keystroke command that marks an endpoint at that location in the video. As another example, a single button may replace the typical keyboard operations of Control Z to undo a prior action and Command +Shift Z to redo an action.

By providing a Redo and Undo button on the interface, the user also avoids having to select such items from a pull down menu, which often requires 3 or more discrete movements/operations with a mouse. In sum, the buttons permit a user to accomplish with one finger or touch what previously required multiple fingers and/or multiple keystrokes.

Any input actions stated above can elicit a response to one or more resulting actions. Pressing "In," for example, can cause the computing device to execute a single "i" command. Yet in other cases a button of a different label, for example "export," can execute a series of actions, often called a macro. For often repeated tasks, a single button can repeat what formerly took multiple steps thus enabling faster execution.

In addition to buttons, jog wheels and other visual cues on the touch screen device, certain embodiments may further comprise means for interfacing with a particular computational apparatus or application residing thereon without requiring a user to look at the interface in order to operate the interface. An example of this embodiment occurs in video editing, where the user is frequently required to maintain visual contact with the video he or she is editing, which prevents the user from looking at the interface and locate the precise buttons associated with a particular task or action. In this example, location-agnostic gestures may be employed, including but not limited to those diagrammed in FIG. 17. In this regard, the location-agnostic gestures are similar to, for example, a two-finger scroll gesture on a touch-sensitive mouse pad.

According to various embodiments described herein, a hierarchical system of gestures may be employed with a tablet style apparatus to execute keyboard or other program commands without requiring the user to observe the customized interface.

Referring now to FIGS. 19-21, multiple "zones" may be created for distinguishing between gestures of a certain type against gestures of the same type, but in a different location on the touch screen device. The zones may be simple, bi-lateral zones as shown in FIG. 19, or may be non-uniform and defined by the user, as shown in FIG. 21. To further illustrate the benefits of multiple zones, a one-finger "swipe" to the right can be executed anywhere in a first "zone" to execute a nudge of one frame of a video that the user is editing. Likewise, a two-finger swipe in the same "zone" can jump to the next cut. A three-finger swipe moves the playhead to the beginning or end of the video, depending on the direction the three finger swipe is made.

A one-finger "slide" (differentiated from a "swipe" by the touch screen capable interface by velocity and sustain) can provide an alternate input for the jog wheel. A two-finger slide may enable a shuttle action (i.e., the further a user's fingers move from the point of origin, the faster the video fast-forwards or rewinds). A two-finger tap executes the "play around" function, while a three-finger tap executes a play from beginning.

An alternative use of the location-agnostic gesture may be provided, for example, in conjunction with an automobile diagnostic system. As touch screens continue to be employed in vehicles, and as automobile infotainment systems become the primary means of changing climate control, radio, satellite navigation and other vehicle functions, it is imperative that interaction design be applied that minimizes the drivers attention, particularly visually, on the vehicle dashboard to operate and observe on-board vehicle diagnostics. Location-agnostic gestures can be applied in these situations to allow drivers to keep their eyes on the road while performing the desired actions (ie. change radio station, increase or decrease the temperature). Audio or other multi-sensory feedback may be employed to let users know, without looking, that they are changing the desired settings. One particular example depicted in FIG. 18 is accomplished by alerting the driver with different sounds and pitches occur for each setting. In a vehicle, this may represent itself as a two-finger swipe up elicits the speaker system to announce "climate control" and the further two-finger swipe causes the temperature to increase, which the vehicle diagnostic system announces (i.e. 72 degrees, 73 degrees, 74 degrees, etc.).

An alternative to complete location-agnostic gestures are zone-based gestures. According to certain embodiments, movements may be "zone specific" and be tied to movements or gestures occurring in individual zones or regions of the interface, such as in the zones depicted in FIGS. 19-21. Where a touch screen or similar input device can be divided into 2 or more sections and each sections has its own set of gestures that are mapped to different functions (i.e., a swipe to the right in one zone causing different results than the same swipe to the right in the other zone).

Zones may be invisible, or alternatively the zones may be demarcated by lines, colors or other visual cues or indicated by buttons or surface texture. An example of the latter would be the image of a chair or seat in an on-board display provided with a vehicle. In this example (FIG. 18), a user may increase a heating element in the user's or a passenger's seat. In this example, the user may begin a gesture on the image of the chair to select the driver or passenger chair, then drag a finger up or down to increase or decrease the chair's heat/cooling.

According to one embodiment, this action may be accompanied by visual cues and/or beeps indicating levels of increase or decrease in temperature, and further comprise a change in pitch as the temperature exceeds certain predetermined ranges. In another example, the user may begin a gesture on the specific location of the chair to select the location of the change in the heating element, then drag a finger up or down to increase or decrease the chair heat/cooling. According to one embodiment, this action may be accompanied by beeps indicating levels of increase or decrease in temperature, and further comprise a change in pitch as the temperature exceeds certain predetermined ranges. Another embodiment of a zone-based gesture system is for color correction purposes. In practice, a user typically has means for correcting color to modify blacks, mid-colors and whites, and/or exposures. In a gesture-based embodiment, the touch screen can be separated into 3 zones, with each zone corresponding to black, mid, and white color ranges. Using one finger in the zone modifies the color wheel in the x/y axis, while two fingers in the z-axis (up and down) can be used to modify the color levels for each color type. Also, starting within a zone locks the control to that range, even if the gesture continues outside of the zone. Another zone may be added that adds additional controls which may include, but is not limited to hue, saturation, luma, gain, lift, gamma and others. This can be executed via a modifier zone and a gesture zone. The modifiers may be selected via buttons, number of touch points, or gestures, with change in levels of these controls done in a gesture zone.

Another potential embodiment of the icon drag method would be to change radio stations in a vehicle, as shown in FIG. 25. In this embodiment a user can begin by placing his finger on an image of a radio or the current radio station numbers and then swipe right or left to change radio stations from preset to preset or next auto-seek radio station. In this case, the initial targets (ie. the radio icon or text or texture or touch sensitive physical button) can be made larger for ease of touch at a glance while maintaining visual focus on the road. Larger touch targets may also permit a cleaner design which aids in quicker actions when a driver cannot provide accurate touch and swipes require no visual focus.

Another embodiment of the zone or location-agnostic gestures is in reference to automotive use. The user may have a display in the dash or in a HUD that displays the current selection (radio, climate control, seat heat, etc.) and a user can adjust that setting with touch-sensitive controls in the steering wheel or console touch screen with location-agnostic swipes or other gestures. The preferred embodiment of this would be to have a small selection of physical buttons on the left side of the steering wheel that allows a user to select from different actions (radio, climate, etc.) and a touch sensitive area on the right that can detect swipes allowing you to control the selected setting, as shown in FIG. 24. This would permit a user to keep both hands on wheel to maintain full control of the vehicle while having access to a variety of settings in a simple interface.

While the present disclosure has focused primarily on touch screen input, other forms of input may be employed. For example, a gyroscope, accelerometer and/or other motion sensors may be used in a computational apparatus to affect the computing device. One example is a physical cube with embedded motion sensors that can relay its orientation and change in orientation to the computing device to affect a 3-dimensional model, as shown in FIG. 26. The physical cube then serves as a proxy for the virtual device. Rotating one axis of the physical cube elicits an identical rotation of the virtual 3D object. The benefit of this is the manipulation of the virtual object feels more direct when manipulating a real-life physical object. Motion sensing may include, but is not limited to, rotation in six axes, as well as translation and orientation of the cube.

One of the criticisms of touch screens is their lack of tactile response thus requiring visual cues for precision input. Gestures can get around this somewhat with location agnostic execution. An alternative would be to add in tactile experience with physical objects that interact with the touch screen. Using conductive materials, one can have a physical wheel that when placed on the screen provides a tactile physical spinning object (whose motion is translated to the screen and then onto the computing device). These physical objects can be sensed by the screen using contact point location or capacitive fingerprinting and underlying visual cues can adjust accordingly. This in turn permits the user to customize their layout to best suit their needs while having the tactile sensation of physical buttons/jog wheels/etc for increased usability and tactile reference.

As the current iteration is executing keyboard emulated commands on the computation device, it is important that they are executed on the intended software program. Pressing "i" in one software program may result in a different action than when executing the same "i" keyboard command in another program. Thus it is important to ensure that the interface and associated software are synchronized. This can be done by the computational device broadcasting the active application and the touch screen receiving this information. If it is the same application the touch screen interface is designed for, all keyboard shortcuts are executed properly. If it is a different application, the touch screen can then change to that interface if it is available, warn the user of the difference, or stop executing commands.

One alternate embodiment is to provide the above-referenced functionality to maintain program parity. For example, if a particular program permits bidirectional communication, this functionality would allow automatic synchronization between the interface and the software program or application. Thus, changing programs on either the touch screen of the computing device automatically changes the other (to maintain parity).

In yet another alternate embodiment, software residing on the computing device can search for installed software and broadcast that to the tablet device to let the user know that interfaces designed for those programs may be available. This benefits the user in realizing there may be interfaces designed for programs they own but didn't realize there were interfaces for it. This can also be used in another embodiment to advertise to the user that interfaces are available and build a user history where the application can recommend new pieces of software that is relevant to their current selection.

Many software applications allow you to create custom keyboard mappings. This is to give the user flexibility in how they prefer to operate their software within the confines of keyboard shortcuts stated above. These can include macros that operate multiple functions with a single user action or unique user-defined settings. To ease transition for these users, the software can import these settings and map the existing actions (In, Out, etc.) to the custom keyboard shortcuts the user has defined. This is done by analyzing all the available actions the program can access, and performing a comparison between the two and substituting the default or software's shortcuts with the users. This way the user can continue to use their keyboard shortcuts as they designed them while the tablet interface can perform them with the custom shortcuts. This is done automatically by importing the file into the software.

According to yet another aspect of the disclosure, a user may have the ability to customize the layout of inputs and the display of the interface. For example, a particular user may only infrequently use a particular icon or button, such as the override button, for example. For that particular user, the presence of a button that is rarely used is distracting and extraneous to the scope of activities the user typically engages in, and may be occupying space on the interface that could be used for another button that the particular user does use. One embodiment of the present disclosure further comprises a customized toolkit, such as a panel, which permits the user to add and remove or modify buttons that appear in a customized interface for providing even further customization. The user could further select the size of the button, the placement of the button, or the color of the button, and select which buttons the user prefers to include with the interface.

This enhanced customization may also extend to the functionality of a button. For example, within a particular button, the functionality may comprise a variety of features associated with different movements, such as a single touch, a double touch, a swipe, a tap to hold, or other alternative movements (for example, see FIGS. 13-16). A user may prefer to have customized functionality, which would permit a user to define the difference between a tap and hold and a simple tap occurring on a particular button. The toolkit would preferably include the ability to edit the interface and assign new functions, and a run mode which permits the user to test the enhanced functionality prior to completing the process.

Other programs, which are not used for video editing, may also be included with the embodiments described herein. For example, programs such as Photoshop or InDesign, which are examples of applications used by designers and/or photographers, who often work with images zoomed in or enlarged. According to these application types, movement-based commands may provide the user with the ability to zoom by gesturing in a pinch-to-zoom manner, or alternatively the user could pan by a two-finger or three-finger gesture. Buttons may also be oriented on the interface to accommodate a right hand or left hand dominance, or provide certain secondary or tertiary buttons that are typically performed with the user's non-dominant hand in a particular zone or section of the interface that is convenient to the user (depending on their particular dominance, either right-handed or left-handed).

Another application for use with the present disclosure is Google mail or gmail. Gmail, like many other applications, has keyboard shortcuts for archiving, deleting, replying, replying to all, etc. The reason behind these keyboard shortcuts is to allow the user to operate the application faster. However, the shortcuts are not always easily recalled by an infrequent user, and are often non-intuitive. Thus, these shortcuts may be integrated into the interface by providing a series of buttons and/or associated gestures, for example, a two-finger swipe to the top left (a throwaway gesture) can accomplish the delete shortcut. Similarly, a reply all may be associated with a three-finger slide down, as compared to a simple reply being associated with a two-finger slide down.

With word processing applications like Microsoft Word, for example, other shortcut keystrokes have popular shortcut options, like bold or underline, or may include some additional or hidden shortcuts. The same concepts described above in this disclosure may be incorporated with an interface designed to communicate with a computational apparatus where the word processing application resides. As for spreadsheet and database applications, such as Microsoft Excel, having these functions and customized buttons available to a user would also provide a considerable advantage.

Another area that may be incorporated in the present disclosure is in an educational environment. As opposed to tutorials, which provide only one-way communication, an interface that knows what actions are being sent and receive feedback from the program can provide interactive instruction in video, text or other delivery format. This can allow the user and the software to interact dynamically to what the user is doing. Similar to a "choose your own adventure," the software can be programmed to cover a variety of different scenarios that guide a user through learning new tasks or techniques of the software. This dynamic nature allows the user to interact as they see fit, or within a limited structure in the educational pathway. This interactivity would be approximate the experience of one-on-one instruction where the user and the educator can explore techniques dynamically without the rigidity of a set and immovable set of instructions.

While various embodiment of the present disclosure have been described in detail, it is apparent that modifications and alterations of those embodiments will occur to those skilled in the art. However, it is to be expressly understood that such modifications and alterations are within the scope and spirit of the present disclosure, as set forth in the claims. It is also expressly understood that the various embodiments herein may incorporate technology developed in the future without departing from the novel aspects of the disclosure, for example, by incorporating touch screen technologies which permit a user to determine an input type based on texture, shape, or other tactile-differentiated distinction.

For purposes of streamlining the present disclosure, certain aspects of the invention have been omitted or truncated. However, to the extent that additional images and/or description is necessary to understand the scope of the present disclosure, applicant hereby incorporates by reference the entire content of the following websites herein: http://w.w.w.CTRLconsole.com, and http://kck.st/RIWN4.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim.

Moreover, though the present disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for remotely communicating with at least one electronic device, comprising:
    an input device, comprising:
        a display screen configured to receive tactile inputs;
        a processor configured to process tactile inputs; and
        means for communicating with the at least one electronic device;
    a program stored in the memory of the input device including instructions for:
        displaying a plurality of icons on the display screen;
        associating each of the plurality of icons with an output;
        receiving one or more types of tactile contact with the display screen;
        determining the nature of a tactile contact with the display screen relative
    to each of the plurality of icons; and
        communicating an associated output to the at least one electronic device based on the step of determining the nature of the tactile contact;
    wherein the plurality of icons are selectable from a list consisting of a wheel, a slide bar, a button, a toggle switch, a linear slide button, a non-linear slide button, and a shortcut button; and
    wherein the one or more types of tactile input are selected from a list consisting of a one-, two-, three-, four- or five-finger linear movement, a one-, two-, three-, four- or five-finger non-linear movement, a one-, two-, three-, four- or five-finger tap, a one-, two-, three-, four- or five-finger tap-hold-drag, a two-, three-, four- or five-finger pinching movement, a two-, three-, four- or five-finger expanding movement, and a one-, two-, three-, four- or five-finger mnemonic movement.

2. The system according to claim 1 wherein the input device and program further comprise two or more zones of the display screen for separating tactile contact received within at least a first zone from tactile contact received within at least a second zone.

3. The system according to claim 2 wherein the at least one electronic device is a computer, wherein the computer further comprises at least one application which receives the associated output from the input device.

4. The system according to claim 2 wherein the input device is a hand-held computer tablet.

5. The system according to claim 1 wherein the input device and the at least one electronic device communicate via a midi protocol.

6. The system according to claim 2 wherein the input device and the at least one electronic device communicate via an OSC protocol.

7. The system according to claim 1 wherein the input device is configured to communicate outputs to at least three electronic devices simultaneously.

8. The system according to claim 1 wherein the program further includes instructions for determining the whether a tactile contact is non-intermittent and calculating an output associated with the tactile contact that varies corresponding to the duration of the tactile contact.

9. The system according to claim 8 wherein the output associated with the tactile contact varies in a linearly proportional relationship to the duration of the tactile contact.

10. The system according to claim 9 wherein the input device is a hand-held tablet and the at least one electronic device is a computer running an application for editing electronic video content.

* * * * *